(12) United States Patent
Menon

(10) Patent No.: US 10,848,372 B2
(45) Date of Patent: Nov. 24, 2020

(54) SCALABILITY, FAULT TOLERANCE AND FAULT MANAGEMENT FOR TWAMP WITH A LARGE NUMBER OF TEST SESSIONS

(71) Applicant: Spirent Communications, Inc., San Jose, CA (US)

(72) Inventor: Jyotikumar U. Menon, Clarksburg, MD (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 15/919,135

(22) Filed: Mar. 12, 2018

(65) Prior Publication Data
US 2019/0280914 A1    Sep. 12, 2019

(51) Int. Cl.
*H04L 12/24* (2006.01)
*H04L 12/26* (2006.01)
*H04L 12/743* (2013.01)

(52) U.S. Cl.
CPC ...... *H04L 41/0654* (2013.01); *H04L 41/5038* (2013.01); *H04L 43/10* (2013.01);
(Continued)

(58) Field of Classification Search
CPC . H04L 41/0654; H04L 41/5038; H04L 43/10; H04L 43/50; H04L 45/7453; H04L 43/0817
See application file for complete search history.

(56) References Cited

U.S. PATENT DOCUMENTS

| | | |
|---|---|---|
| 8,711,708 B2 | 4/2014 | Wallman |
| 9,485,165 B2 | 11/2016 | Allan et al. |

(Continued)

FOREIGN PATENT DOCUMENTS

| | | |
|---|---|---|
| CN | 106534230 A | 3/2017 |
| EP | 3099016 A1 | 11/2016 |

OTHER PUBLICATIONS

Yang by example, https://trac.ietf.org/trac/edu/raw-attachment/wiki/IETF94/94-module-2-yang.pdf, Nov. 5, 2015, 35 pages.
(Continued)

*Primary Examiner* — Walter J Divito
*Assistant Examiner* — Anthony Luo
(74) *Attorney, Agent, or Firm* — Haynes Beffel & Wolfeld, LLP; Ernest J. Beffel, Jr.

(57) ABSTRACT

The disclosed methods and systems of using TWAMP measurement architecture for testing a large network include a control-client running on a first network host initializing memory for test session parameters used to originate a test, parsing a configuration file to populate the memory with IP addresses, ports and QoS parameters for control-servers and session-reflectors; and originating test sessions using the test session parameters. The method includes extending to thousands of control-clients, each originating respective test sessions with control-servers in a mesh network using respective test session parameters; and while the test is running, optionally sending an updated configuration file to at least one control-client that introduces a new control-server or replaces a control-server; and the control-client parsing the updated configuration file and updating memory to include the new control-server IP address, port numbers and QoS parameters; and expanding the test and monitoring the running test sessions for results.

20 Claims, 11 Drawing Sheets

(52) U.S. Cl.
CPC .......... *H04L 43/50* (2013.01); *H04L 45/7453* (2013.01); *H04L 43/0817* (2013.01)

(56) References Cited

U.S. PATENT DOCUMENTS

| | | | |
|---|---|---|---|
| 9,503,344 | B2 | 11/2016 | Chakrabarti et al. |
| 9,531,621 | B2 | 12/2016 | Kolhi et al. |
| 9,654,370 | B2 | 5/2017 | Welin et al. |
| 2007/0288552 | A1 | 12/2007 | Snyder |
| 2009/0279441 | A1* | 11/2009 | Wong ................. H04L 41/0631 370/242 |
| 2009/0285575 | A1 | 11/2009 | Abidi et al. |
| 2013/0088977 | A1 | 4/2013 | Baillargeon |
| 2014/0029441 | A1 | 1/2014 | Nydell |
| 2014/0119221 | A1 | 5/2014 | Park et al. |
| 2014/0169183 | A1* | 6/2014 | Allan ..................... H04L 43/10 370/248 |
| 2014/0211636 | A1 | 7/2014 | Robitaille |
| 2014/0226507 | A1 | 8/2014 | Bonnier et al. |
| 2014/0258524 | A1* | 9/2014 | Thyni ................. H04L 43/0852 709/224 |
| 2014/0301215 | A1 | 10/2014 | Somoskoi et al. |
| 2015/0056995 | A1* | 2/2015 | Baillargeon ...... H04W 36/0022 455/436 |
| 2016/0028603 | A1 | 1/2016 | Chakrabarti et al. |
| 2016/0191367 | A1 | 6/2016 | Mirsky et al. |
| 2016/0218927 | A1 | 7/2016 | Johnsson et al. |
| 2016/0352865 | A1 | 12/2016 | Gupta et al. |
| 2017/0019323 | A1 | 1/2017 | Allan et al. |
| 2017/0289011 | A1 | 10/2017 | Johnsson et al. |
| 2018/0165693 | A1 | 6/2018 | Jain et al. |
| 2018/0270149 | A1 | 9/2018 | Jiao et al. |
| 2018/0375753 | A1* | 12/2018 | Mirsky ............... H04L 41/0873 |
| 2019/0059008 | A1 | 2/2019 | Liu |

OTHER PUBLICATIONS

"TWAMP Explained Measuring Performance in IP Networks", RAD www.rad.com, Sep. 2014, pp. 1-11.

Mirsky, et al., "Two-Way Active Measurement Protocol (TWAMP) Light Data Model", Network Working Group, Jun. 28, 2016, Internet draft valid for 6 months, http://datatracker.ietf.org/drafts/current/, 21 pages.

Clark, "RFC 813 Window and Acknowledgement Strategy in TCP", MIT Laboratory for Computer Science Computer Systems and Communications Group, Jul. 1982, 22 pages.

"RFC 793—Transmission Control Protocol", Darpa Internet Program, Protocol Specification, Sep. 1981, 90 pages.

Civil, et al., "Two-Way Active Measurement Protocol (TWAMP) Data Model", draft-ietf-ippm-twamp-yang-05, Oct. 18, 2017, Internet draft valid for 6 months, http://datatracker.ietf.org/drafts/current/Draft, 65 pages.

Hedayat, et al., A Two-Way Active Measurement Protocol (TWAMP), Network Working Group, Standards Track, Copyright (c) The IETF Trust (2008), Oct. 2008, 26 pages.

"Zero-touch Network and Service Management—Introductory White Paper", Miscellaneous Contributing Organisations & Authors, available at this link: https://portal.etsi.org/TBSiteMap/ZSM/OperatorWhitePaper, Dec. 7, 2017, 5 pages.

Morton, "RFC 6673 Round-Trip Packet Loss Metrics", ISSN: 2070-1721, AT&T Labs, Internet Engineering Task Force (IETF), https://tools.ietf.org/html/rfc6673, Aug. 2012, 28 pages.

Demichelis, et al., "RFC 3393 IP Packet Delay Variation Metric for IP Performance Metrics (IPPM)", Network Working Group, https://tools.ietf.org/html/rfc3393, Nov. 2002, 42 pages.

Mills, "RFC 1305 Network Time Protocol (Version 3) Specification, Implementation and Analysis", Network Working Group, Electrical Engineering Dept., University of Delaware, mills@udel.edu, Mar. 1992, 115 pages.

"Test and Monitoring Solutions for SDN and DNFV Network Operations", Spirent, spirent.com, Jun. 9, 2016, pp. 1-8.

"ETSI GS NFV-REL 004 V1.1.1", Network Functions Virtualisation (NFV); Assurance; Report on Active Monitoring and Failure Detection, http://www.etsi.org/standards-search, Apr. 2016, pp. 1-61.

Ersue, "ETSI NFV Management and Orchestration—An Overview", IETF #88, Vancouver, Canada, Published E2E Arch, REQ, Use Case,Terminology documents in ETSI NFV Open Area: http://docbox.etsi.org/ISG/NFV/Open/Published/, Jan. 2, 2014, 14 pages.

U.S. Appl. No. 15/936,346—Office Action dated Jun. 21, 2019, 32 pages.

"RFC 5938—Individual Session Control Feature for the Two Way Active Measurement Protocol (TWAMP)", Internet Engineering Task Force (IETF), Aug. 2010, 17 pages.

"RFC 5357—A Two-Way Active Measurement Protocol (TWAMP)", Network Working Group, Oct. 2008, 26 pages.

"DLPs A300 to A399", Cisco ONS 15454 Procedure Guide Release R5.0, Mar. 2005, 102 pages.

"RFC 7750—Differentiated Service Code Point and Explicit Congestion Notification Monitoring", Internet Engineering Task Force (IETF), Feb. 2016, 11 pages.

U.S. Appl. No. 15/919,039—Non-Final Office Action dated Nov. 14, 2019, 12 pages.

U.S. Appl. No. 15/919,039—Response to Non-Final Office Action dated Nov. 14, 2019 filed Dec. 27, 2019, 14 pages.

U.S. Appl. No. 15/919,039—Notice of Allowance dated Jan. 17, 2020, 11 pages.

U.S. Appl. No. 15/936,346—Response to Office Action dated Jun. 21, 2019 filed Jan. 7, 2020, 24 pages.

U.S. Appl. No. 15/919,105—Notice of Allowance dated Feb. 7, 2020, 26 pages.

U.S. Appl. No. 15/936,346—Final Office Action dated Apr. 9, 2020, 40 pages.

* cited by examiner

FIG. 4

(PRIOR ART) TWAMP-Test Session-Sender Message (PRIOR ART) TWAMP-Test Session-Reflector Message

SCALABILITY, FAULT TOLERANCE AND FAULT MANAGEMENT FOR TWAMP WITH A LARGE NUMBER OF TEST SESSIONS

RELATED APPLICATIONS

The following materials are incorporated by reference as if fully set forth herein:

This application is filed contemporaneously with a related U.S. application Ser. No. 15/919,039, entitled "SECURE METHOD FOR MANAGING A VIRTUAL TEST PLATFORM", filed on Mar. 12, 2018; and This application is filed contemporaneously with a U.S. application Ser. No. 15/919,105, entitled "ACCELERATION OF NODE CONFIGURATION FOR TWAMP WITH A LARGE NUMBER OF TEST SESSIONS", filed on Mar. 12, 2018.

FIELD OF THE TECHNOLOGY DISCLOSED

The technology disclosed relates generally to performance measurement of telecommunication transport networks with a large number of test sessions.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Two-Way Active Measurement Protocol (TWAMP) has been standardized by the Internet Protocol Performance Metrics (IPPM) working group of the Internet Engineering Task Force (IETF) for characterizing the performance measurement of telecommunication transport networks—for measuring two-way, also referred to as round-trip, metrics between network devices. Two-way measurements are common in IP networks, primarily because synchronization between local and remote clocks is unnecessary for round-trip delay, and measurement support at the remote end may be limited to a simple echo function. The TWAMP protocol has a TWAMP-Control phase and a TWAMP-Test phase. The TWAMP-Control phase is used to initiate, start and stop test sessions between Control-Client and Server logical entities. The TWAMP-Test phase is used to exchange test packets and measure network performance metrics.

An embodiment of TWAMP that has only two hosts in the architecture does not have the capability to enable the same number of network paths for testing as a full mesh network topology for measurement would have. When only two hosts are specified in the TWAMP measurement architecture, it is only possible to test a single path through a network under test. In an architecture embodiment with four possible paths through the network, a control-client logical entity could be in one host, a session-sender logical host could be in another host, a control-server logical host could be in yet another host and a session-reflector logical entity could be in a fourth host. Key Performance Indicator (KPI) measurement can only be made in the path through the network between the session-sender logical entity and session-reflector logical entity. The path through the network between the control-client and control-server does not include KPI measurement. The TWAMP measurement architecture can be extended by using a full mesh network topology, with multiple session-senders and multiple session-reflectors.

An opportunity arises to extend the TWAMP measurement architecture by using a full mesh network topology, and making it feasible to scale the mesh network and selectively remove elements from a test, via configuration of test nodes, to enable the processing of incremental updates to nodes. It becomes more practical to implement performance measurement testing on a large scale, using a disclosed mesh topology with TWAMP measurement architecture—for improvements in scalability and fault tolerance for TWAMP with a large number of test sessions.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a method of enhancing scalability and fault tolerance using TWAMP measurement architecture for testing very large networks. The method includes causing a control-client running on a first network host: to initialize an in-memory data store of test session parameters used to originate a test including a set of two-way test sessions originating from the first network host; to parse a configuration file to populate the in-memory data store with destination IP addresses, TCP and UDP transport ports and IP quality of service (abbreviated QoS) parameters for control-servers and session-reflectors; and to originate test sessions with the control-servers and session-reflectors using the test session parameters. The disclosed method also includes extending the causing to initializing the in-memory data store, parsing the configuration file, and originating test sessions to dozens to thousands of control-clients, each originating respective test sessions with control-servers in a mesh network using respective test session parameters. Optionally, while the test is running, the test operator can send an updated configuration file to at least one control-client that introduces a new control-server or replaces a control-server. The control-client would parse the updated configuration file and update the in-memory data structure to include the new control-server destination IP address, TCP and UDP transport port numbers and IP QoS parameters; and expand the test to include the new control-server. The disclosed method also includes monitoring the running test sessions with the control-servers for reports of results.

Some implementations of the disclosed method further include causing the control-client to initialize and populate a server hash table data store with an index entry to test session parameters stored in memory for each of the control-servers and session-reflectors; extending the causing, to initialize and populate the server hash table data store, to dozens to thousands of control-clients, each originating respective test sessions with control-servers running on additional network hosts in a mesh network using respective test session parameters. The method also includes while the test is running, causing the control-client to generate an index entry into the server hash table data store for the new control-server; and causing the control-client to determine, using the generated index entry, whether the new or replaced control-server is represented in the server hash table data store, and if not represented, updating the server hash table data store by adding an index entry representing the new or replaced control-server. The ability to add control-servers without needing to stop and restart ongoing tests contributes to scalability for performance measurement of telecommunication transport networks with a large number of test sessions. The ability to replace control-servers that have failed or that need maintenance, without needing to stop and restart ongoing tests, contributes to fault tolerance for performance measurement of telecommunication transport networks with a large number of test sessions.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 4 shows an excerpt of config file twamp3000.cfg with 3000 sessions.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

In a local mesh network topology, infrastructure nodes connect directly, dynamically and non-hierarchically to as many other nodes as is feasible for the system being implemented and cooperate with one another to efficiently route data. The lack of dependency on one node allows for every node to participate in the relay of information, and mesh networks can dynamically self-organize and self-configure, as well. In a full mesh network, each node is connected to every other node in the network.

In existing systems, to add a new TWAMP host to an existing network for scalability, any ongoing test needs to be stopped because configuration files are monolithic, not incremental. Stopping ongoing tests introduces disruption in the network characterization. Additionally, if one of the hosts fails or needs to be removed for maintenance, any ongoing test needs to be stopped which introduces disruption in the network characterization.

The disclosed mesh network methods and systems make it feasible to scale the mesh network and selectively remove elements from a test, via a configuration file for configuration of test nodes—to enable processing of incremental updates to nodes.

In the conventional TWAMP measurement architecture there are only two hosts, each with specific logical entities. The host that initiates the TWAMP-Control phase has the Control-Client and Session-Sender logical entities and the other host has the Server and Session-Reflector logical entities. The TWAMP control and test packets follow a single logical path through the network between these two hosts.

In contrast, full mesh measurement architecture enables the capability to measure many network paths. An example system for extending the TWAMP measurement architecture, by using a full mesh network topology to enable processing of incremental updates to nodes, to improve scalability and fault tolerance for TWAMP performance measurement for a large number of test sessions is described next.

Figure 1:
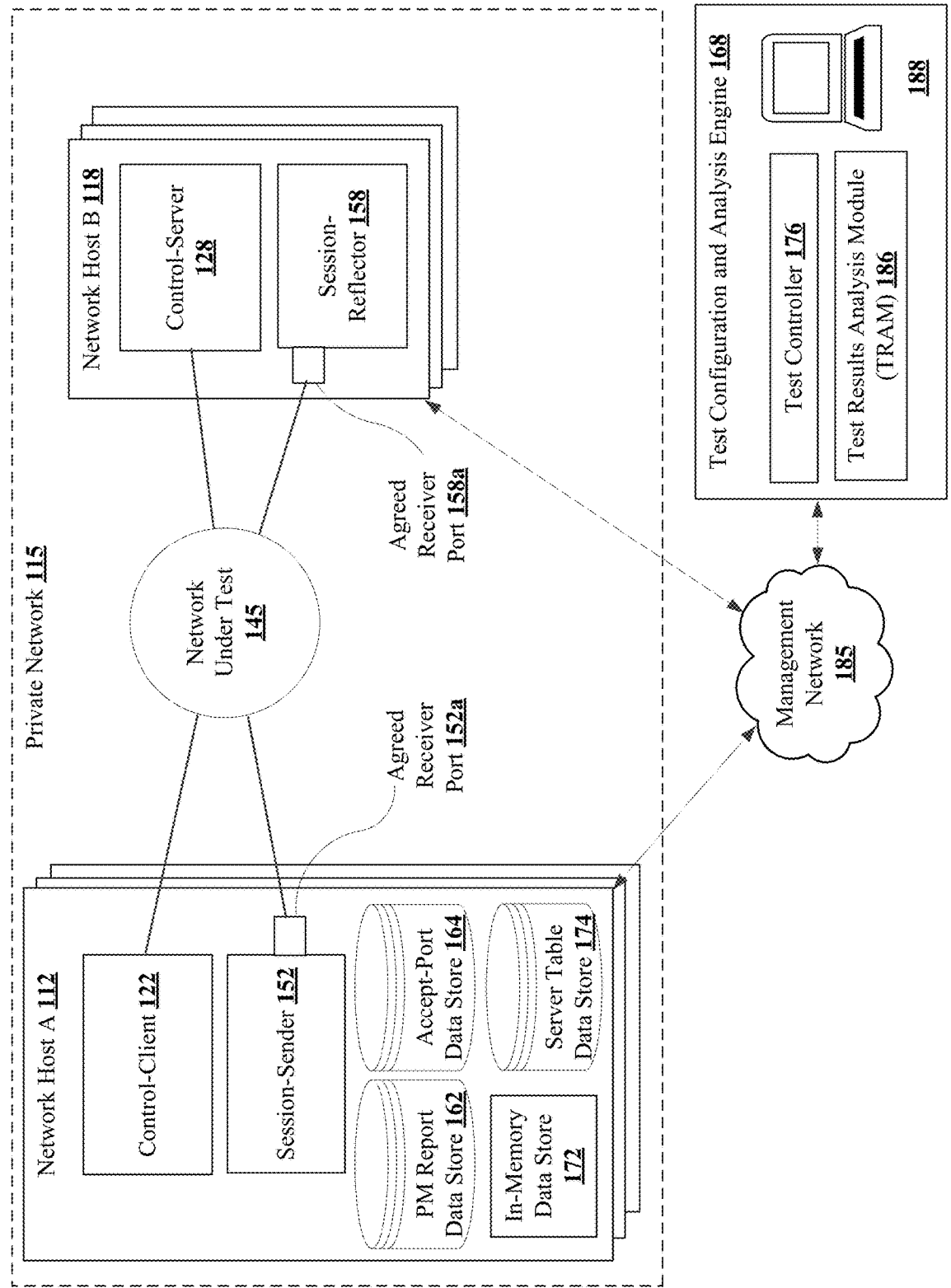
FIG. 1 depicts an exemplary system for improving scalability and fault tolerance for TWAMP with a large number of test sessions, according to one implementation of the technology disclosed.

FIG. 1 shows example architecture 100 for improving scalability and fault tolerance for TWAMP performance measurement with a large number of test sessions. Architecture 100 includes network host A 112 with control-client 122 and session-sender 152 with agreed receiver port 152a, and network host B 118 with control-server 128 and session-reflector 158 with agreed receiver port 158a. As shown in FIG. 1, control-client 122 and session-sender 152 logical entities reside in one network host and the control-server 128 and session-reflector 158 logical entities in another network host with the network whose performance is being measured between these two hosts. The host that initiates the transmission control protocol (TCP) connection takes the role of control-client 122 and session-sender 152. A single set of components is discussed as representative of the functionality common to dozens to thousands of control-clients and servers. Hundreds to thousands of control-clients, session-senders, control-servers and session-reflectors are represented in FIG. 1 via the cascading hosts. In one implementation, multiple control-clients, session-senders, servers and session-reflectors can be resident on a single host.

In software-defined networking (SDN) and network-function virtualization (NFV) environments, network host A 112 and network host B 118 can be virtual test platforms (VTPs) and control-client 122 and control-server 128 can run as virtual test applications (VTAs) on virtual network functions (VNFs) inside a virtual machine (VM) or in a Docker container running on a physical host. The VM is a self-contained environment with its own operating system (VMOS) separate from the host operating system which runs the hypervisor and controls the VMs. Each VM has its own processor address space, memory address space and networking address space with network layer resources including Internet Protocol (IP) addresses and transport layer resources including TCP or UDP port numbers. A Docker container is a lightweight self-contained environment sharing the host operating system, but with its own processor address space, memory address space and networking address space with network layer resources including IP addresses and transport layer resources including TCP or UDP port numbers.

SDN/NFV based network architectures come with a wide range of requirements, including massive capacity, imperceptible latency, ultra-high reliability, and support for massive machine-to-machine communication. Networks are being transformed into programmable, software-driven, service-based and holistically-managed infrastructures.

Continuing with the description of FIG. 1, network host A 112 includes accept-port data store 164 for storing proposed User Datagram Protocol (UDP) ports, indexed by an order in which the ports for test sessions are allocated. Network host A 112 also includes server hash table data store 174 for storing server and test session information for VTAs, to be used for TWAMP testing. Additionally, FIG. 1 shows network-under-test 145, which can use NFV architecture comprising virtualized routers and switches, an SDN architecture in which the control plane and data plane are separated into white box routers and switches, or a conventional network architecture comprising routers and switches.

Also included in architecture 100 is management network 185 through which test configuration and analysis engine 168 communicates with the TWAMP control-clients in network host A 112 and TWAMP control-servers in network host B 118.—including configuration files for TWAMP servers to be used in TWAMP tests. Test configuration and analysis engine 168 includes test controller 176, test results analysis module (TRAM) 186, and performance measurement (PM) report data store 162.

The configuration file is designed for service assurance testing of a customer's revenue generating SDN network. Control setup is one of the procedures that is part of the testing. A network operator specifies network routes as part of the virtual platform. A network maintenance operations manager sets up the configuration files for the network to be tested, including details such as how many test sessions for which server nodes, via user interface 188. In some implementations, multiple network maintenance operations managers, each setting up configuration files for testing systems in their own company's network name spaces, could utilize multiple test controllers to configure multiple sets of test sessions for multiple networks. Test controller 176 sends the completed configuration file to control-client 122, which parses the configuration file and creates an in-memory data store with accept-port data structure content and server hash table data store content.

When session tests are complete, control-client 122 stores the performance measurement results in PM report data store 162 and sends the performance metric session test results to TRAM 186 for use by test controller 176 in analyzing the network under test. In one implementation, TRAM 186 is an integral part of test configuration and analysis engine 168 that collects or receives test results from the network hosts and analyzes test results and presents the results to an operator in an actionable format via user interface 188. In one implementation, the reports can be very large and they get generated often—potentially every one minute, two minutes or ten minutes, depending on the configuration parameters set by the operator to test the specific network. For example, testing of a network with three thousand nodes with 120 kB per five minutes for each node produces billions of bytes of test results per twenty-four hour period. In some implementations the report data gets analyzed via big data analytics.

In some implementations, test controller 176 manages the test agents and probes, providing test instructions to the test probes, coordinating the test scheduling when multiple tests with large number of test probes are executed, and retrieving results from TRAM 186 to provide actionable information to the network operator.

The hierarchy of the TWAMP streams and sessions can be represented as follows.
Stream1
    Session1
    Session2
Stream2
    Session1
    Session2

Session-sender 152 and the session-reflector 158 exchange test packets according to the TWAMP-Test protocol for each active session. Session-Sender 152 transmits TWAMP-test packets with a transmit timestamp and sequence number, as shown next. A TWAMP-test session-sender message includes the following message fields.
Sequence Number (4 bytes)
Timestamp (8 bytes)
Error Estimate (2 bytes)
Packet Padding (Variable bytes)

An example test message sender frame data structure is shown next.

```
typedef struct{
    uint32_t            sequence_number;
    uint64_t            timestamp;
    unsigned short error_estimate;
}_attribute_((packed)) twamp_sender_frame_payload_t;
```

Session-reflector 158 reflects this packet back to session-sender 152 after inserting a timestamp and sequence number and copying the sender's timestamp and sequence number, as shown next. A TWAMP-test session-reflector message includes the following message fields. MBZ refers to 'must be zero'.
Sequence Number (4 bytes)
Timestamp (8 bytes)
Error Estimate (2 bytes)
MBZ (2 bytes)
Receive Timestamp (8 bytes)
Sender Sequence Number (4 bytes)

Sender Timestamp (8 bytes)
Sender Error Estimate (2 bytes)
MBZ (2 bytes)
Sender TTL (1 byte)
Packet Padding (Variable bytes)

An example of the receiver frame payload data structure is shown next.

```
typedef struct{
    unsigned int sequence_number;
    uint64_t timestamp;
    unsigned short error_estimate;
    unsigned short MBZ_1;
    uint64_t rcvd_timestamp;
    unsigned int
       sender_sequence_number;
    uint64_t sender_timestamp;
    unsigned short sender_error_estimate;
    unsigned short MBZ_2;
    unsigned char sender_TTL;
}_attribute_((packed)) twamp_receiver_frame_pay-
load_t;
```

Session-sender 152 uses the received information to calculate Key Performance Indicators (KPIs) including packet loss, packet out-of-sequence, packet delay and packet jitter characteristics of the network path between session-sender 152 and session-reflector 158, as well as disclosed new KPIs, described infra.

Figure 2:
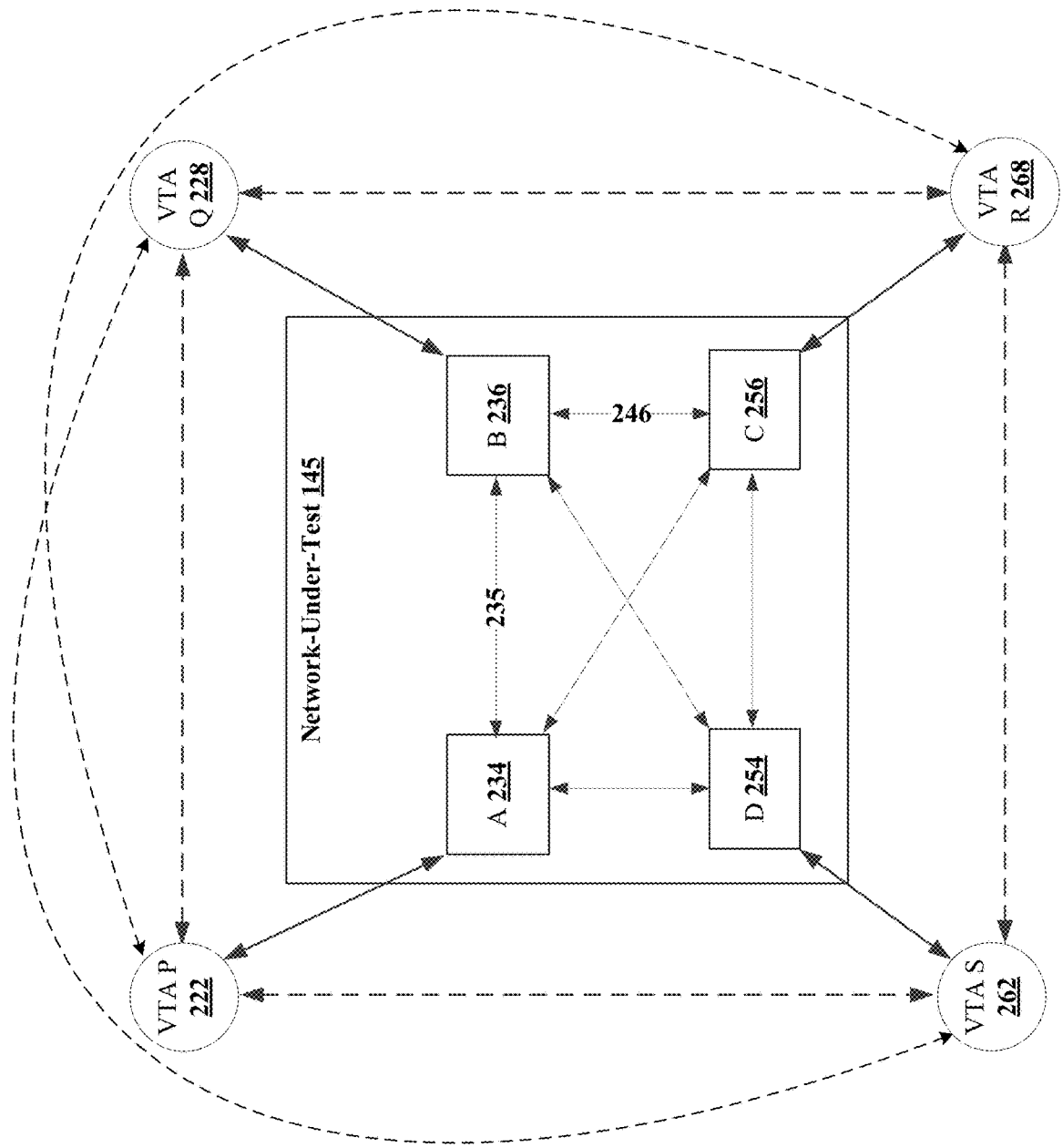
FIG. 2 shows an example mesh network for TWAMP testing of a network-under-test.

FIG. 2 shows an example mesh network for TWAMP testing of network-under-test 145. In the full mesh TWAMP measurement architecture, the TWAMP hosts are distributed at strategic points in network-under-test 145 which includes router A 234, router B 236, router C 256 and router D 254. VTA P 222, VTA Q 228, VTA R 268 and VTA S 262, which can each run both TWAMP client and server, provide service assurance to network-under-test 145. The dotted lines show virtual connections among the test nodes: VTA P 222, VTA Q 228, VTA R 268 and VTA S 262.

In the event of VTA Q failing or being taken away for maintenance, the network paths AB 235 and BC 246 can continue to be tested by the TWAMP client running on VTA P testing to TWAMP server running on VTA R or by TWAMP client running on VTA R testing to TWAMP server running on VTA P, if the network operator has set up the config file to include these tests between the routers in the network under test. In this document, config file and configuration file are used interchangeably, with the same meaning.

The node distribution for the mesh network is optimized in such a way that all the network paths can be fully characterized using KPI, including but not limited to one-way delay, jitter and packet loss. In this full mesh TWAMP measurement architecture, each TWAMP host is both the initiator and receiver of TWAMP test sessions. Assuming a full mesh of n hosts there would be (n−1) paths through the network. In the full mesh architecture this is extended to (n−1)² paths, in one implementation, to assure that multiple redundant paths through the network can be fully characterized using KPIs for superior service assurance in the network.

A configuration file that characterizes the addressing information and test parameters gets downloaded to each TWAMP host in the full mesh measurement architecture, at the beginning of the TWAMP test, via test controller 176. The host running TWAMP uses the information in the downloaded configuration file to initiate TWAMP tests to the other hosts running TWAMP server in the full mesh architecture.

As the underlying network scales, more and more new TWAMP hosts can be added to characterize new network paths. This requires modification of the configuration file that is being used by the existing TWAMP hosts. To ensure that the modification of the configuration file does not disrupt the ongoing network testing, the current disclosed technology includes a method to incorporate the newly added TWAMP hosts into the full mesh measurement architecture without the need to stop and restart the TWAMP test currently running on every TWAMP host, which can introduce gaps in the characterization of the network, as it takes time for the TWAMP testing to stabilize.

The disclosed technology also ensures fault tolerance: if some of the TWAMP hosts that are part of the full mesh measurement architecture fail or need to be removed for maintenance, they can be replaced with new TWAMP hosts and the configuration file can be augmented to include updated information, without disrupting the ongoing network testing.

Figure 3B:
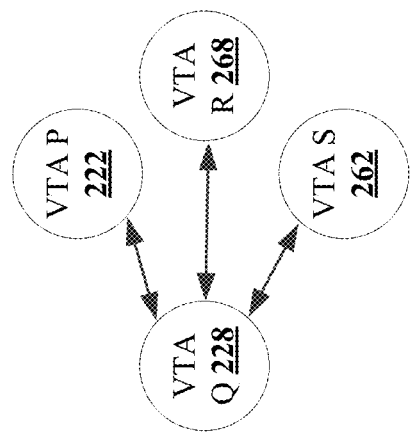
FIG. 3B, shows connectivity for the example mesh network architecture of FIG. 2 for VTA Q 228 testing to TWAMP servers running on VTA P 222, VTA R 268 and VTA S 262.
Figure 3D:
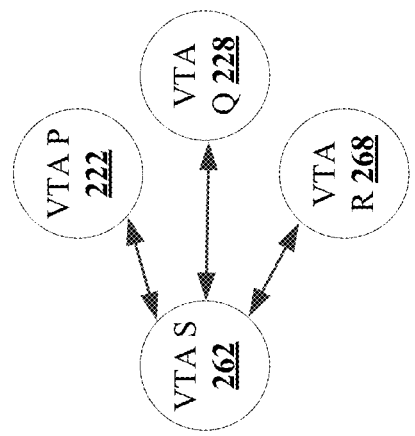
FIG. 3D shows connectivity for the example mesh network architecture of FIG. 2 for VTA S 262 testing to TWAMP servers running on VTA P 222, VTA Q 228 and VTA R 268.
Figure 3A:
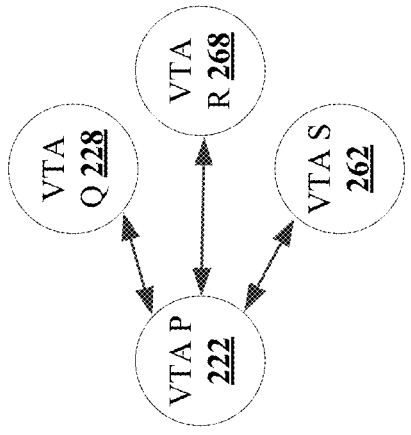
FIG. 3A shows connectivity for the example mesh network architecture of FIG. 2 for VTA P 222 client testing to TWAMP servers running on VTA Q 228, VTA R 268 and VTA S 262.
Figure 3C:
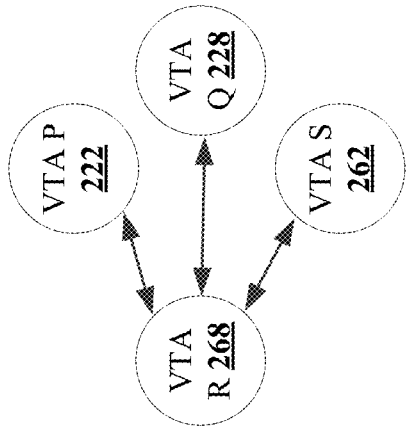
FIG. 3C shows connectivity for the example mesh network architecture of FIG. 2 for VTA R 268 testing to TWAMP servers running on VTA P 222, VTA Q 228 and VTA R 268.

FIG. 3A, FIG. 3B, FIG. 3C and FIG. 3D show connectivity for the example mesh network architecture of FIG. 2 and specify which virtual test agents receive configuration confirmation files for which probes. VTA P 222, VTA Q 228, VTA R 268 and VTA S 262 each run both TWAMP client and server. VTA P 222 client in FIG. 3A is testing to TWAMP servers running on VTA Q 228, VTA R 268 and VTA S 262. Similarly, VTA Q 228 in FIG. 3B is testing to TWAMP servers running on VTA P 222, VTA R 268 and VTA S 262. VTA R 268 in FIG. 3C is testing to TWAMP servers running on VTA P 222, VTA Q 228 and VTA R 268. VTA S 262 in FIG. 3D is testing to TWAMP servers running on VTA P 222, VTA Q 228 and VTA R 268. As can be seen from the connectivity model, in the event of VTA Q 228 failing or being taken away for maintenance, the network paths AB 235 and BC 246 continue to be tested by the TWAMP client running on VTA P 222 testing to TWAMP server running on VTA R 268 or by TWAMP client running on VTA R 268 testing to TWAMP server running on VTA P 222, depending on how the routes/paths are set up between the routers in network-under-test 145 by the network operator.

A mathematical representation of the data structure for a full mesh network of n VNF probes running TWAMP client and TWAMP server is described next. Stream $M_{ij}$ is the set of ordered pairs $\{C_i, S_j\}$ with i≤(i . . . n) and j=(i+1 . . . n) where $C_i$ is the set of VNFs that run the TWAMP clients and $S_j$ is the set of VNFs that run the TWAMP servers with a bi-directional TCP connection link $T_{ij}$.

Each of these streams $S_{ij}$ can have m sessions. Session $N_{xy}$ is the set of ordered pairs $\{S_x, R_y\}$ with x=(i . . . m) and y=(1 . . . m), in which $S_x$ is the set of session senders and $R_y$ is the set of session-reflectors with a bi-directional UDP connection link $U_{xy}$, running on each of the VNFs that constitutes the stream $S_{ij}$.

For setting up a session $N_{xy}$ belonging to stream $S_{ij}$, the client $C_i$ sends a TWAMP-Session-Request $TSR_{xy}$ to server $S_j$. The server $S_j$ accepts this session by sending a TWAMP-Session-ACK message $TSA_{xy}$ back to client $C_i$ on the bi-directional TCP connection link $T_{ij}$. For every TWAMP-Session-Ack message received, the accept session index accept-$idx_{ij}$, which is maintained per stream $S_{ij}$ is incremented to track the sessions, using the accept flag field and port field in $TSA_{xy}$. If the accept field indicates rejection, then accept-$idx_{ij}$ is used to index into them session table and update the session configuration with the new destination port information provided by the server. So for every stream $S_{ij}$ them sessions $N_{xy}$ can be setup $$= \sum_{\{x=1,y=1\}}^{\{x=m,y=m\}}$$

set of ordered pairs $\{TSR_{xy}, TSA_{xy}\}$.

The config file is designed for service assurance testing of a customer's revenue generating SDN network. Control setup is part of the testing procedures, and is described in detail in "Acceleration of Node Configuration for TWAMP with a Large Number of Test Sessions" incorporated herein by reference.

In the example described relative to FIG. 3A-3D with four VTAs, test controller 176 downloads configuration files to the control-clients in each of VTA P 222, VTA Q 228, VTA R 268 and VTA S 262 at the beginning of the TWAMP test. The configuration file specifies how VTAs behave as source. The configuration file for each of the VTAs characterizes the addressing information, and includes IP addresses and both TCP and UDP transport port numbers, along with test parameters such as the test frame length and IP quality of service (QoS) parameters, to the TWAMP hosts in the full mesh measurement architecture.

```
[SERVER, <oVlan>,<oPtyCtrl>,[<iVlan>],
[<iPtyCtrl>],<addr>,[<mask>],
[<gateway>],[<twampPort>],<qosCtrl>,
[<startTimeFormat>],[<lightMode>]
<cr> <lf> /* maps to the stream data structure
struct_twamp_pm_stream_cfg */
[<oPty>, [<iPty>],<dstPort>,<srcPort>,<qos>,[<latencyThreshRt>],
[<jitterThreshRt>],[<padding>],[<latencyThreshNear>],
[<jitterThreshNear>],[<latencyThreshFar>],[<jitterThreshFar>],
[<sesLossThreshRt>],[<sesEnhThreshRt>],[<uasLossCriteriaRt>],
[<uasEnhCriteriaRt>],[<flowLabel>],
[<fps>,<frmLen>,[<frmLenMax>] ]
<cr><lf > ]+ ]+ /* maps to the session data structure
struct_twamp_pm_sess_cfg */
```

Customers can specify as many servers and as many sessions as they prefer. The configuration file utilizes a unique ID for each of the servers. One <opty> refers to one server line. If ten sessions per server, then each server session would have ten [opty] lines. The + at the end of the example configuration file represents that there can be multiple servers and multiple sessions in those servers, and unique data.

A description of the fields used in the configuration file follows. <oVlan> is a VLAN tag for all test traffic to the respective server target, including control traffic. For all TWAMP control traffic associated with the respective server, <oPtyCtrl> is the priority for the VLAN tag. Note that priorities for TWAMP test traffic are specified independently on a per-stream basis (<oPty>/<iPty>). <iVlan> is the inner VLAN tag for all test traffic to the respective server target, including control traffic. For all TWAMP control traffic associated with the respective server, <iPtyCtrl> is the priority for the inner VLAN tag. It is only applicable if <iVlan> is present and greater than −1. If not applicable, it can be omitted. Destination IP address for test traffic, a TWAMP server is specified in the <addr> field. The address needs to be unicast, as the test will attempt to reject any broadcast address. The mask field includes an optional subnet mask and default gateway to use in conjunction with the <addr>. If specified, the test effectively configures a "sub-interface" that will use this information for routing decisions when it transmits traffic related to the respective target, rather than the original information specified. By allowing the direct specification of these parameters, any given stream can effectively transmit on any particular subnet on the link, aside from the original subnet established. <twampPort> is the TCP port number that the client connects to in order to set up the TWAMP test. This is the control traffic port used to set up the TWAMP session, not the port to which test traffic is sent once the session is set up. <qosCtrl> is the QoS setting for TWAMP control traffic, as a differentiated service code point (DSCP) numerical setting. This setting is for the initial traffic related to TCP setup negotiations and TWAMP control messages only. The TWAMP test traffic uses individual settings for each stream (<qos> or <qosX>). <startTimeFormat> is the format for the timestamp in the session request (Request-TW-Session) message. <lightMode> enables/disables TWAMP Light mode. When TWAMP Light mode is enabled, the test will allow test traffic to be initiated for all streams associated with the server even if the initial TCP connection fails.

Descriptions of stream-specific parameters follow. <oPty> and <iPty>: for TWAMP test traffic only, the priorities for the VLAN tags. <iPty> is only applicable if <iVlan> is present and greater than −1. If not applicable, it can be omitted. <dstPort>, for the respective stream, is the destination port; that is, the destination port number that appears in the UDP header of test packets transmitted by the unit (the "session-sender"). If the requested port is already in use or otherwise refused by the reflector, the client and server will negotiate and use a different port. In all cases, the actual port used is reported in the test results. <srcPort>, for the respective stream, the source port; that is, the source port number that appears in the UDP header of test packets transmitted by the unit (the "session-sender"). <qos> is the QoS setting for test traffic, as a DSCP or DiffServ numerical setting. This setting is for all test traffic except TCP setup negotiations and TWAMP control messages, which use the <qosCtrl> parameter. <latencyThreshRt> <latencyThreshNear> and <latencyThreshFar> are latency thresholds for the respective stream and path in msec, with a functional granularity of 0.1 msec., notated as follows: "RT", "Rt", or without notation—full roundtrip path. "NE" or "Ne"—near end path, referring to the latency of packets sent from the TWAMP reflector to the unit. "FE" or "Fe"—far end path, referring to the latency of packets sent from the unit to the TWAMP reflector. In the results, the test reports the total number of packets that exceeded these thresholds, respectively for the different paths. If any of these parameters are omitted, all results related to violations of the respective threshold will be reported as NA.

Continuing with further descriptions of stream-specific parameters, <jitterThreshRt>, <jitterThreshNear>, and <jitterThreshFar> are Jitter thresholds for the respective stream and path in msec, with a functional granularity of 0.1 msec., notated as follows: "RT", "Rt", or without notation—full roundtrip path. "NE" or "Ne"—near end path, referring to the jitter of packets sent from the TWAMP reflector to the unit. "FE" or "Fe"—far end path, referring to the jitter of packets sent from the unit to the TWAMP reflector. In the results, the test reports the total number of packets that exceeded these thresholds, respectively for the different paths. If any of these parameters are omitted, all results related to violations of the respective threshold will be reported as NA. <padding> is packet padding in TWAMP test packets, as defined in the RFC. <sesLossThreshRt>, <sesEnhThreshRt> are percentages that determine when loss-based and "enhanced" severely-errored seconds (SES) are counted (respectively), for reporting in the results. Note that this parameter is ignored if <calAvail>=OFF (command input parameter). <uasLossCriteriaRt>, <uasEnhCriteriaRt> are criteria by which the test determines whether an interval enters a loss-based or an enhanced "unavailable window" (respectively), after which severely-errored seconds become counted as unavailable seconds (UAS). The value represents the number of consecutive seconds after which severely-errored seconds trigger an unavailable window event. Note that this parameter is ignored if <calAvail>=OFF (command input parameter). <fps> is the frame rate for the stream, in frames per second (fps). <flowLabel> is an IPv6 flow label, applicable only when the target is an IPv6 address. <frmLen> is the frame size to use for the stream, in bytes. The frame size represents the total number of bytes in the Ethernet frame including the FCS but not the VLAN tag(s). <frmLenMax> is the maximum frame size to use for the stream, in bytes. If specified, the stream uses a range of frame sizes between <frmLen> and <frmLenMax>. Otherwise, all frames are the size of <frmLen>. Note that when a range of sizes is used, the distribution of sizes across the range is even.

Figure 4:
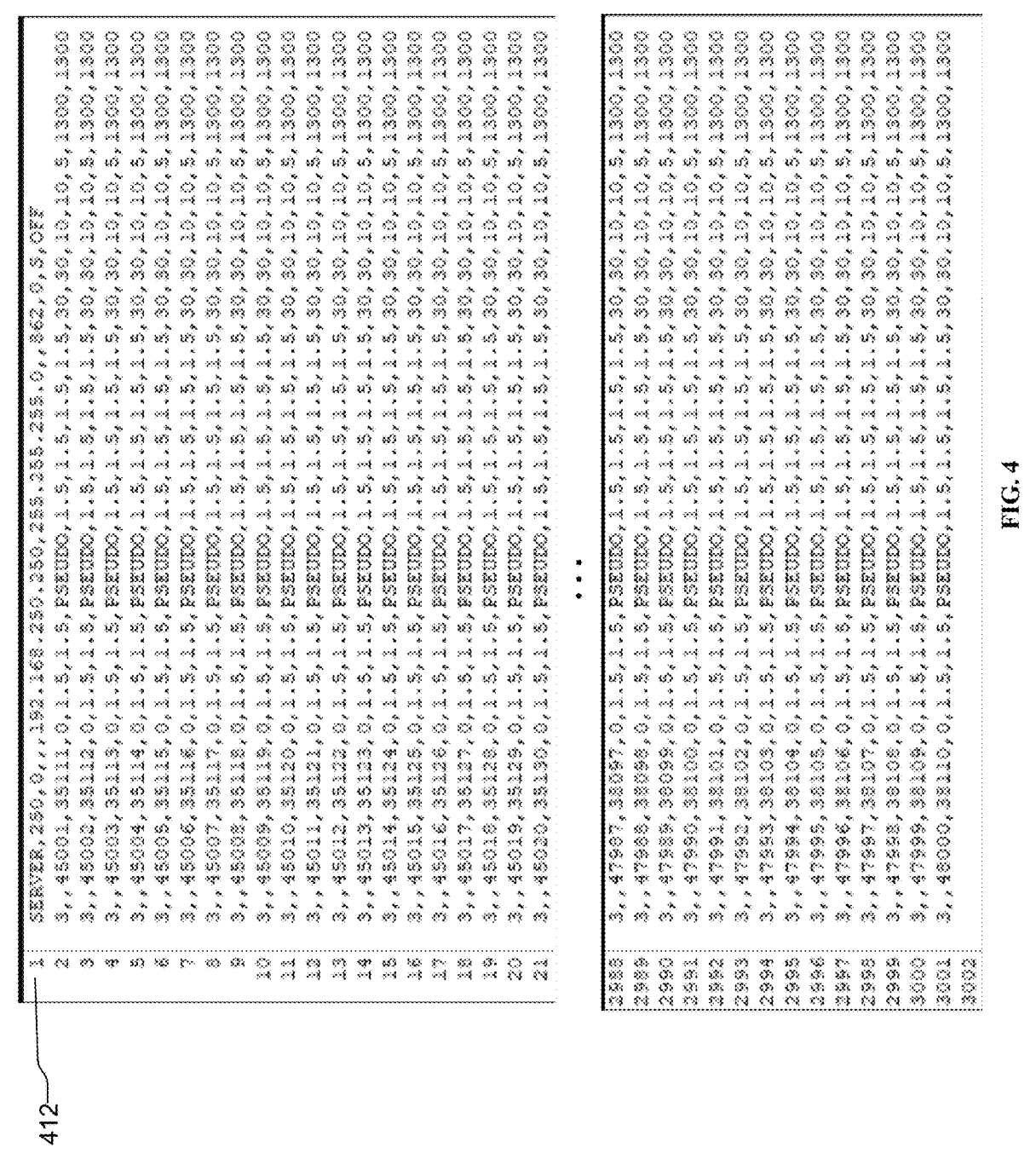

In the full mesh architecture, each TWAMP client uses the information in the configuration file, described supra, to initiate TWAMP tests to the TWAMP server specified in the configuration file. FIG. 4 shows an excerpt of config file twamp3000.cfg with 3000 sessions for one server 412.

Server hash table data store 174 is implemented as a hash table—an associative array that maps a test session server to the session data specified in the configuration file for testing. A hash function is used to compute an index into the array to the session server. An advantage of using the hash table is the minimal time taken to insert, access, and delete entries. When the maximum number of entries is known at the time of test creation, hash tables are very efficient. In this implementation, the server addressing information is six bytes.

Hashing is the method of distributing the entries, which are the key/value pairs, into an array of buckets. Given a key, the hash function computes an index marking the location of the entry. The load factor is an important performance indicator for the hash table: load-factor=n/b where n is the number of entries as key/value pairs, and b is the number of buckets in the array. In one implementation, a load-factor of 0.5 has been empirically found to be optimal.

Index=$f$(key) where $f$ is the hash function.

The index can be calculated as follows:

hash=hash_func(key,keylen,magic_number).

The magic number is empirically calculated for different datasets. A magic number that is appropriate for one example dataset is 0x5a5ee1d9. Hash functionality includes mixing the key value using standard arithmetic operators, including shifts and exclusive-or operations using further magic numbers such as 0x5bd1e995 and 12 so that a resultant hash value spreads across the key address space to prevent collisions. The index can be calculated as follows.

Index=hash &(array-size−1)

In one use case, the array-size is selected to be $2^i$ in which the exponent i is close to the value of 2*n, to get a load-factor of 0.5 and to avoid the use of the modulo operator and use the 'and' operator, which can be implemented faster in the CPU hardware.

In one implementation an open addressing strategy, with linear probes with the probe interval set to 1, is utilized to prevent collisions. Using this strategy, when a new entry needs to be inserted, the index can be calculated using the key as described supra. If the entry is occupied, indicating a collision, the subsequent buckets are probed one at a time until an empty index is found and the entry is inserted there. Search for the entry proceeds in a similar manner. This can be represented mathematically as follows.

Let U be the universe of possible keys U→{0, 1, . . . , n}. Let H be the hash table with the smaller set of keys: H→{0, 1, . . . , m} where m<n.

Element with key k hashes to slot θ(k) using the hash function θ U→H. The operations then become HASH-INSERT(T,x) with insert x in T[θ(k)] where k is key for x. If T[θ(k)] is not empty, use open addressing with linear probing to find slot r and insert x in T[r]. Operation HASH-DELETE(T,x) specifies delete x from T[θ(k)]. If x is not the value at T[θ(k)] then use open addressing with linear probing to find slot r and delete x from T[r]. Third operation is HASH-SEARCH(T,x): search for an element x with key k in T[θ(k)]. If the value doesn't match x, then use open addressing with linear probing to find slot r with a value that matches x and return it.

Figure 5:
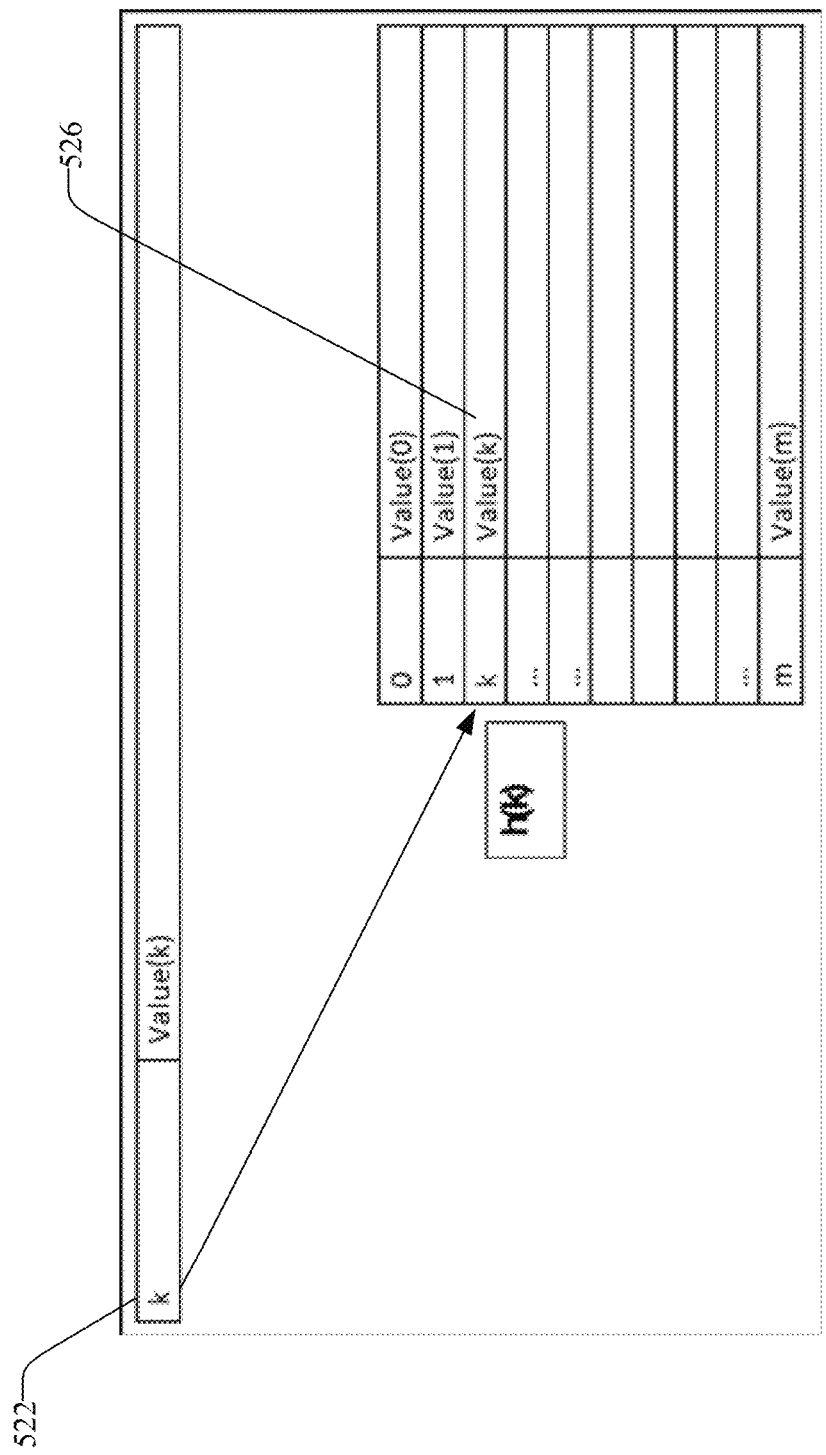
FIG. 5 shows an example server hash table data store entry.

FIG. 5 shows an example server hash table data store entry. The 6-byte input k 522 consists of a 4-byte IP address and a 2-byte UDP port, which is a transport layer endpoint of the end-to-end test session. In one implementation, the 6-byte input is a 4-byte IPv4 address extensible to 16-byte IPv6 addresses which is a network layer endpoint of the end-to-end session, and a 2-byte UDP port number. In an implementation of IPv6 the input would be extended to 18 bytes. The 6-byte input k 522 is hashed to an index within 0-6143 for 6,144 possible entries. Each value (k) 526 is a pointer to the stream and associated session info data stored in memory, as shown in the following data structures. When the configuration file is downloaded to the TWAMP client, it is parsed and converted and stored to an in-memory data store.

TWAMP performance metric stream configuration parameters are listed next. Index values can communicate packet stream characteristics along with one or more metrics to be measured. The per-stream config data structure is described next.

```
typedef struct_twamp_pm_stream_cfg
{
    uint32 server;
    uint32 mask;
    uint32 gateway;
    StartTimeFormatType start_time_format;
    LightModeType light_mode;
    uint16 vlan:13;
    uint16 pty_ctl:3; /* vlan priority */
    uint16 iVlan: 13;
    uint16 iPty_ctl:3; /* inner vlan priority */
    uint16 twamp_port;
    uint16 qos_ctl;
} twamp_pm_stream_cfg_t;
```

The per-session config data structure is described next.

```
typedef struct_twamp_pm_sess_cfg
{
    avail_thresh_t avail_thresh;
    int lat_thresh_rt; /* in us */
    int jitt_thresh_rt; /* in us */
    int near_lat_thresh; /* in us */
    int near_jitt_thresh; /* in us */
    int far_lat_thresh; /* in us */
    int far_jitt_thresh; /* in us */
    int fps;
    int frame_len;
```

```
    int frame_len_max;
    calcType calAvail;
    calcType calSD;
    PaddingType padding;
    uint16 dst_port;
    uint16 src_port;
    uint8 pty_data; /* vlan priority */
    uint8 iPty_data; /* inner vlan priority */
    uint8 qos_dscp;
}twamp_pm_sess_cfg_t;
```

Scalability and fault tolerance is enabled with the use of this configuration file and hash table. Parsed configuration file data, including test session parameters for a server node and set of test sessions, is stored in an in-memory data store. Whenever the initial configuration file is downloaded to the TWAMP client, the server hash table data store is initialized and maintained. The configuration file is parsed and the server addressing information is used to generate a hash to index into this hash table. The entry at this index is marked as being in use.

If a new VTA is introduced into the TWAMP measurement architecture, for scalability, the configuration file is updated with the information about this new VTA. If a VTA fails or needs to be removed for maintenance and a replacement VTA is introduced into the TWAMP measurement architecture for fault tolerance, the configuration file gets updated with the information about this replacement VTA. When nodes are removed from the test, results from those nodes are not reported. The TWAMP client, on receiving a new configuration file, parses it and checks the server hash table for information about the new VTA. If the server information is not found, then this is assumed to be a new VTA and testing can start to this new VTA. This disclosed technology enables the capability to address scalability and fault tolerance in the TWAMP measurement architecture without affecting the testing that is in progress to the VTAs that are already deployed in network-under-test 145.

For fault tolerance in monitoring of a network-under-test, three cases are described next. In the case in which a server goes offline, TRAM 186 detects that the test results are indicating 100% packet loss. After a threshold of results is received with 100% packet loss, TRAM 186 generates an alarm into the operational support system (OSS), which generates a ticket for the network operator to replace the offline server. In a first case, the operator may determine that a server is not needed at the particular location indicated by the server's IPv4 or IPv6 address. In a second case, the operator may determine that a server is needed at that particular location. In this case a new network host VTP with the same IP address is deployed at that location.

Figure 6:
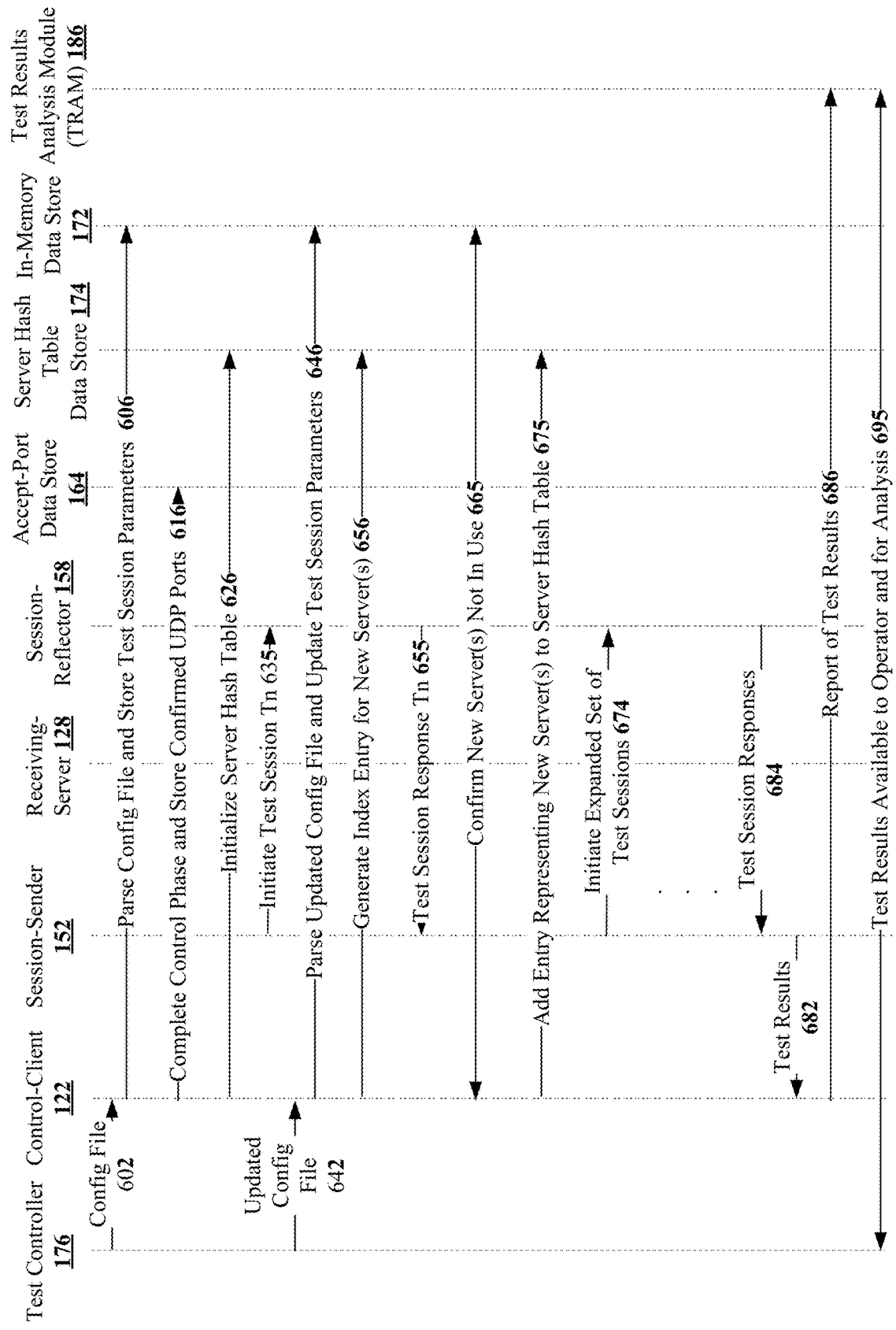
FIG. 6 shows a message flow for scalability for TWAMP with mesh network architecture.

FIG. 6 shows a series of messages for deploying servers for TWAMP testing. The operator completes the configuration file with the addressing information for the server and test controller 176 pushes config file 602 to control-client 122, which parses the config file and stores test session parameters 606 to in-memory data store 172. Control-client 122 completes the control phase for TWAMP and stores confirmed UDP ports 616 in accept-port data store 164, initializes server hash table 626 in server hash table data store 174. Session-sender 152 initiates test sessions T1 through Tn 635 to session-reflector 158 and receives tests session response T1 through Tn 655 back at session-sender 152. FIG. 6 also shows the message flow for deploying a new server. The operator updates the configuration file with the addressing information for the new or replaced server and test controller 176 pushes config file 642 to control-client 122, which parses the updated config file and updates test session parameters 646 to in-memory data store 172. Control-client 122 generates the index entry for new server 656 and stores the index in server hash table data store 174. Control-client 122 confirms that the new server is not in use 665 and adds an entry representing the new server to server hash table 675. Session-sender 152 initiates an expanded test of test sessions 674, without stopping any test sessions already in progress. Test results 682 are monitored by control-client 122 and reports of test results 686 are made available to TRAM 186. Test results are made available to the network maintenance operator and for big data analysis 695 through test controller 176. The same set of messages shown in FIG. 6 would apply when adding multiple servers for testing a mesh network.

Figure 7:
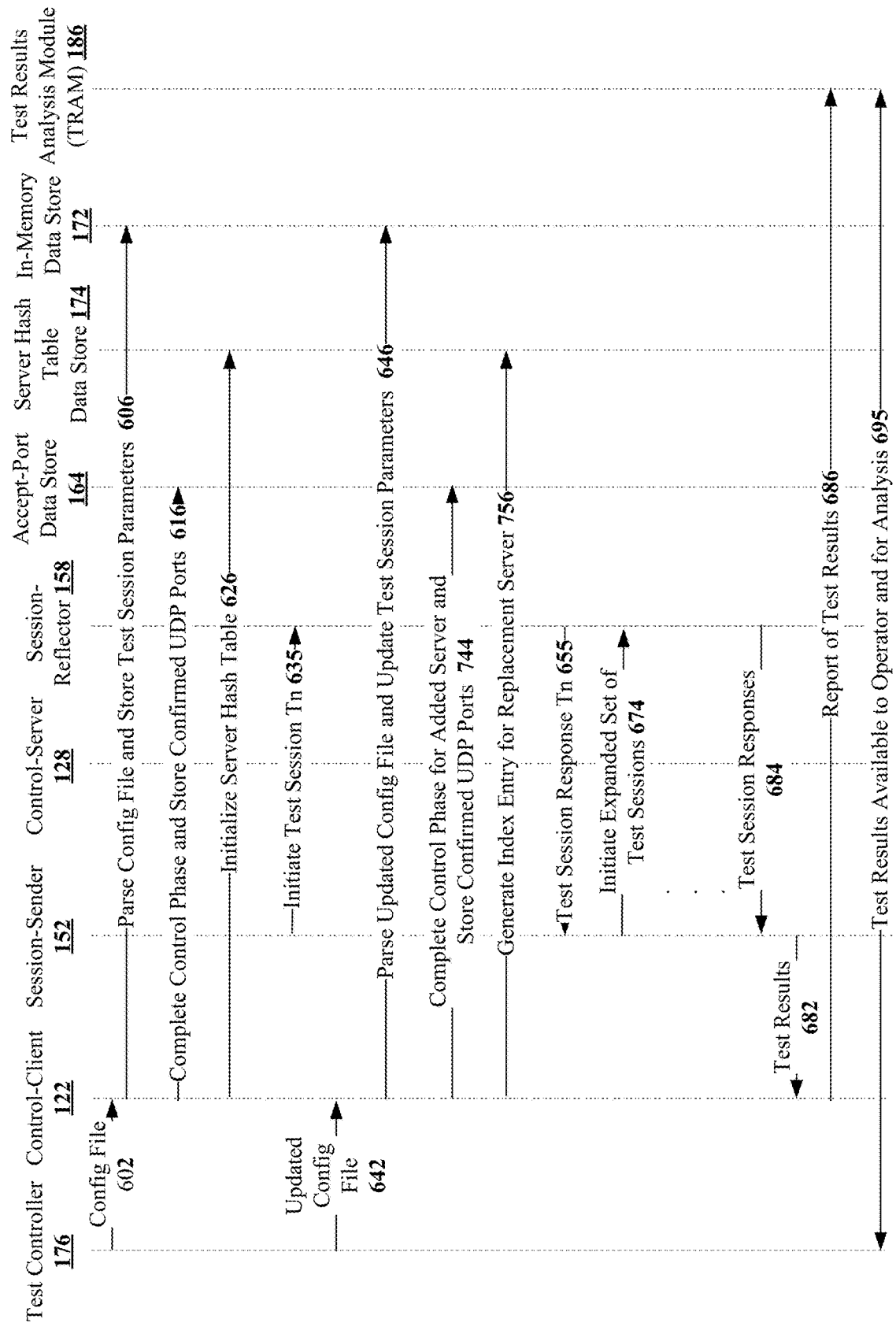
FIG. 7 shows a message flow for fault tolerance for TWAMP with mesh network architecture.

For the second case, described supra, FIG. 7 shows a message flow for adding a replacement server to ensure fault tolerance for TWAMP with mesh network architecture. Control-client 122 parses the updated config file and updates test session parameters 646 in in-memory data store 172. The control phase is initiated for the replacement server and confirmed UDP port is stored 744 in accept-port data store 164. The expanded test with test session packets 674 are initiated to session-reflector 158, after control-client 122 generates the index entry for the replaced server 756.

In a third case in which a server goes offline, the network maintenance operator may determine that a server is not needed at that particular location but at a different location. In this case a new network host VTP is deployed at that location with a different IP address corresponding to that location. The operator also updates the config file with the addressing information for the replaced server. This config file is then pushed to all the control-clients, which parse the config file and initiates the control and test sessions to the new server, as shown in FIG. 6 and described supra.

Test Controller 176 sends the REST API command, listed next, to start the TWAMP server, in one implementation. In this example, the TRAM endpoint is a pointer to the results repository for the client's files.

```
curl -X POST --header 'Content-Type:
application/yang-data+json' -header 'Accept:
application/yang-data+json' 'http://10.32.88.27:
8080/api/v2/data/vta-twamp:test-
twamp-server/server/test-sessions=TWAMP_SERVER/' -d ' {
{
  "vta-twamp:test-sessions": [
    {
      "name": "TWAMP_SERVER",
      "test-controller": {
        "backup-controller-address": "",
        "controller-address": "127.0.0.1",
        "measurement-method": "template",
        "test-group-id": "1",
        "tram-endpoint": "http://127.0.0.1:8082/api/v2/results/1/"
      },
      "test-parameters": {
        "control-port": 862,
        "duration": 0,
        "refwait": 900,
        "servwait": 900,
        "virtual-link": {
          "connection-point": {
            "ipv4": {
              "addr": "3.3.3.40",
              "gateway": "3.3.3.1",
              "prefix": "3.3.3.0/24"
            }
          },
          "connectivity-type": "ELINE",
```

```
            "id": 1,
            "root-requirement": {
              "cbs": 100,
              "cir": 30
            }
          }
        }
      }
    ]
}
```

The client data structure is represented as follows, with per client statistics maintained by server.

```
typedef struct_twamp_client_stats
{
    uint32 ctl_pkts_rx;
    uint32 ctl_pkts_tx;
    uint32 sess_pkts_rx;
    uint32 sess_pkts_tx;
    uint16 curr_sess;
    uint16 compl_sess;
    uint16 rej_sess;
    uint16 abort_sess;
    char start_tm[32]; /* format yymmdd-hhmmss */
    char stop_tm[32]; /* format yymmdd-hhmmss */
    char init_tm[32]; /* format yymmdd-hhmmss */
    int32 client_ip;
    void *pSvr; /* hook to associated server */
}twamp_client_stats_t;
```

The control block for each TWAMP server is described next.

```
typedef struct_twamp_server_ctx
{
    int accept_sock;
    struct sockaddr sa_cl_addr;
    uint32 client_ip;
    void *pParams;
    int16_t active;
    int16_t host_route_added; /* Host route added for every client that connects */
    int started;
    int test_status;
    pthread_t thd_id;
    int thd_cancel;
    uint32 sender_ip;
    uint32 svr_ip;
    int16_t finished;
    int16_t sess_num;
    struct ether_addr dst_eth;
    char ifname[IFNAMSIZ];
    time_t last_rx_tm;      /* Used for session inactivity check */
    uint16 ref_port[MAX_TWAMP_SESSIONS]; /* reflector port */
    char cl_str[INET_ADDRSTRLEN];
    /* Pointing to actual data in server_ctx */
    twamp_client_stats_t *pStats;
    uint8 rx_buf[MAX_TWAMP_MSG_SZ];
    uint8 tx_buf[MAX_TWAMP_MSG_SZ];
    mmap_cb_t map_cb;
} twamp_server_ctx_t;
```

The Test Controller sends the REST API command that follows, to start the TWAMP client.

```
curl -X POST -T config_file --header 'Accept: application/yang-data+json'
'http://10.32.88.27:8080/api/v2/data/vta-twamp:test-twamp-client/client/test-sessions=TWAMP_CLIENT/'
{ "vta-twamp:test-sessions": [
    { "name": "TWAMP_CLIENT",
      "test-controller": {
```

```
        "backup-controller-address": "",
        "controller-address": "127.0.0.1",
        "measurement-method": "string",
        "test-group-id": "1",
        "tram-endpoint": "http://127.0.0.1:8082/api/v2/results/1/"
      },
      "test-parameters": {
        "duration": 5,
        "fps-list": [ 5 ],
        "reporting-interval": 300,
        "retry-interval": 30,
        "sequence-checking": true,
        "stream-list": [
          {"address": "3.3.3.40",
            "gateway": "3.3.3.1",
            "prefix": "3.3.3.0/24",
            "qos-ctrl": 10,
            "start-time-format": "strict",
            "stream-info-list": [
              {"dst-port": 13000,
                "fps": 5,
                "frame-len": 256,
                "jitter-thresh-far": 10,
                "jitter-thresh-near": 10,
                "jitter-thresh-rt": 10,
                "latency-thresh-far": 10,
                "latency-thresh-near": 10,
                "latency-thresh-rt": 10,
                "padding": "pseudo",
                "qos": 40,
                "src-port": 1123
              }],
            "twamp-port": 862} ],
        "tmo": 250,
        "virtual-link": {
          "connection-point": {
            "ipv4": {
              "addr": "3.3.3.51",
              "gateway": "3.3.3.1",
              "prefix": "3.3.3.0/24"
            }
          },
          "connectivity-type": "ELINE",
          "id": 1,
          "root-requirement": {
            "cbs": 100,
            "cir": 10 }
        }
      }
    }
  ]
}
```

Figure 8:
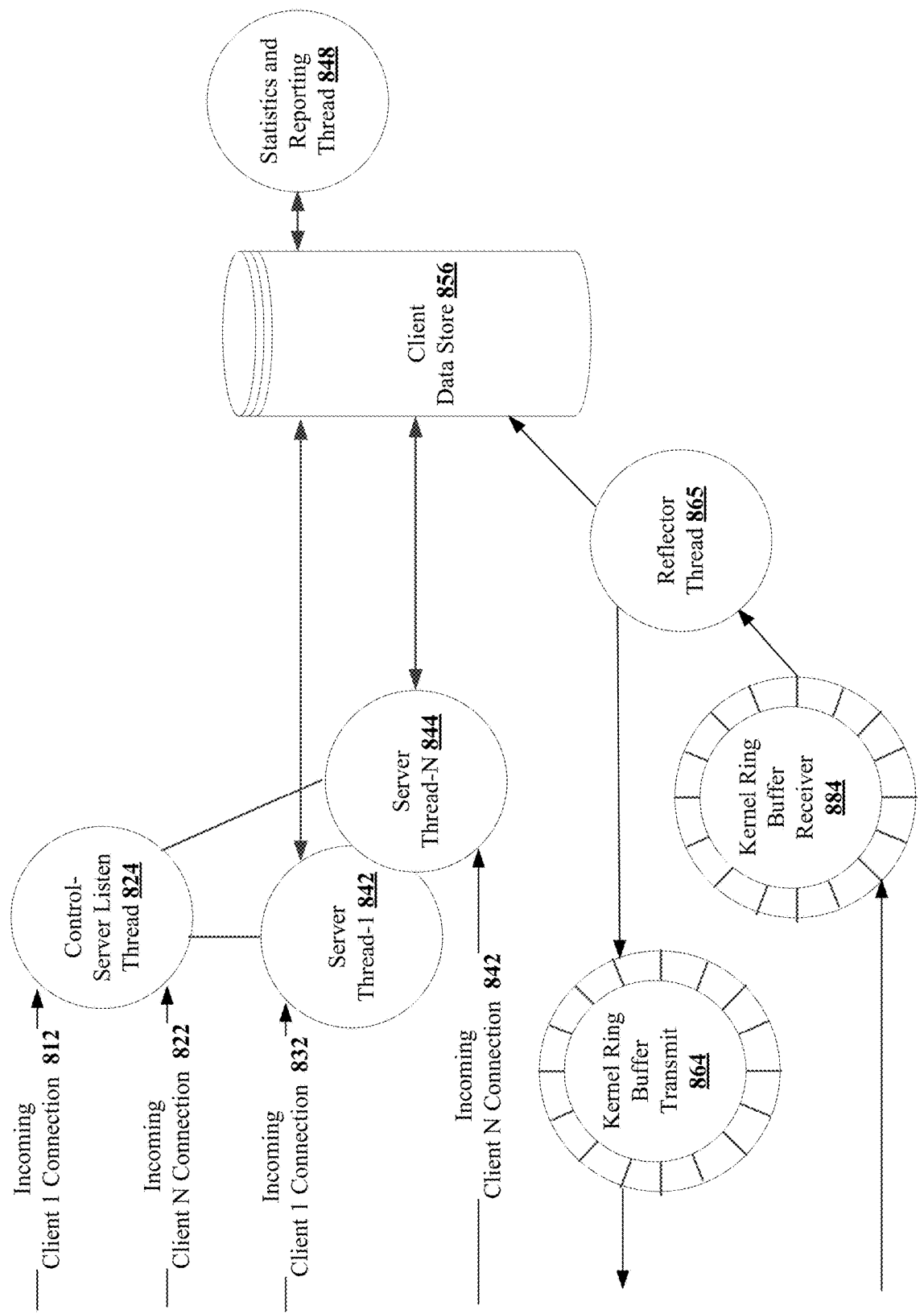
FIG. 8 shows an example of the testing flow for the TWAMP mesh network.

FIG. 8 shows an example of the testing flow for the TWAMP mesh network. The control-server listen thread 824 processes incoming client connections 812, 822 on well-known TWAMP port 862 which is defined by Internet Assigned Numbers Authority (IANA) for the TWAMP server. When client one initiates a connection 832, 842 a server thread 842, 844 is spawned to process the control-setup messages, and the listen thread continues to process incoming connections from other clients, which ensures parallelism. A client hash table is created and the client entry for the client is added to the client data store 856. The IP address of the client (4 bytes if IPv4 or 16 bytes if IPv6) is used as input into the hash function. When the control-setup for all the sessions is complete, a reflector thread 865 is spawned, which functions as the session-reflector to reflect the test packets received from the session-sender for all the sessions, via Kernel Ring Buffer Receiver 884 and Kernel Ring Transmit Buffer 864. The Statistics and Reporting Thread 848 access the data stored in client data store 856 to generate statistics and report them to the TRAM.

Figure 9:
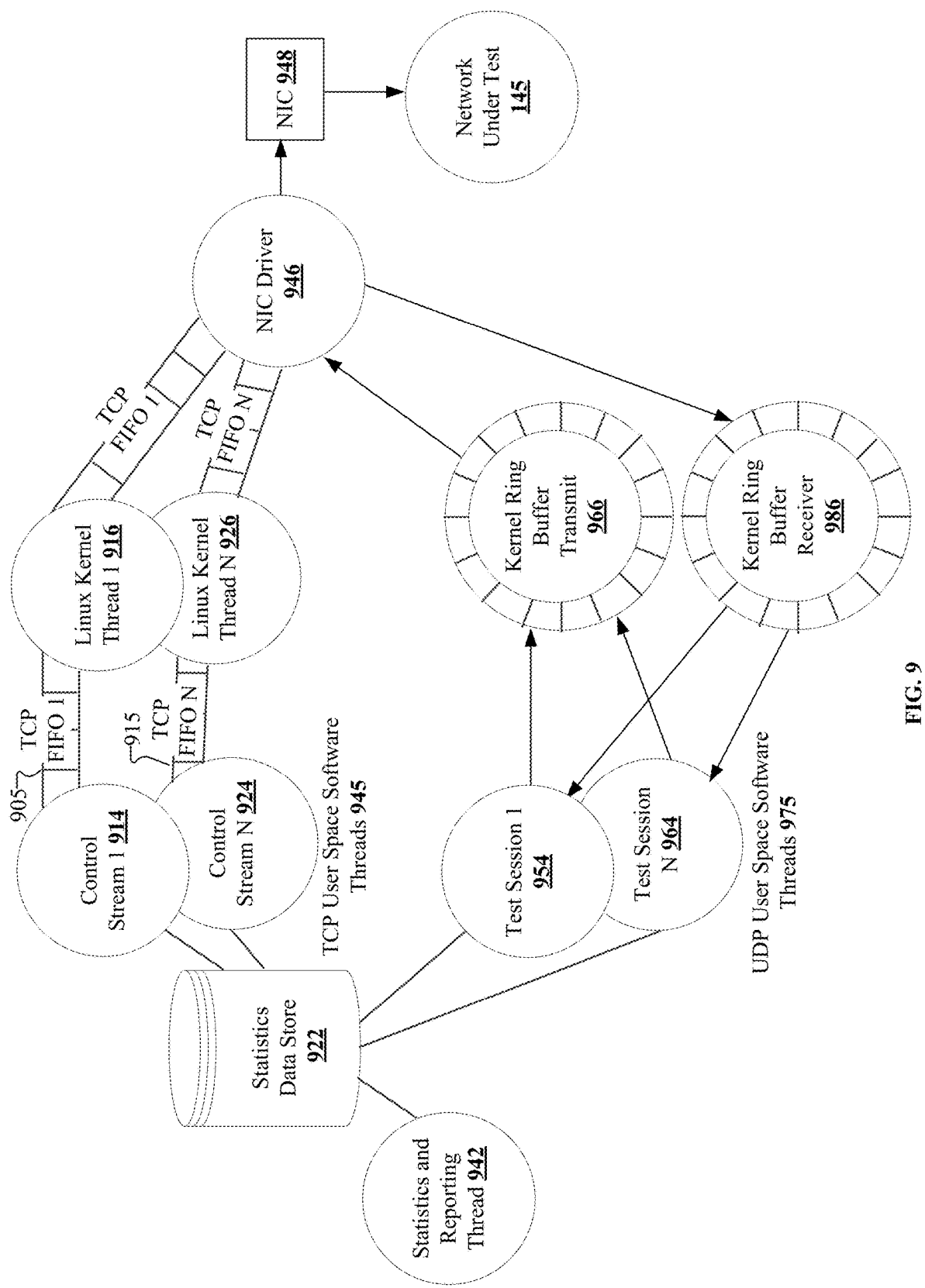
FIG. 9 shows a block diagram of an example software implementation designed as a parallel processing and distributed system with lock free access to share data.

FIG. 9 shows a block diagram of an example software implementation of the disclosed technology, to demonstrate the parallel processing and distributed system with lock free access to share data. The TCP control setup on individual control streams 914, 924 proceeds in parallel using separate FIFO queues 905, 915 per stream. The TCP user space software threads 945 communicate with the Linux Kernel software threads 916, 926 using FIFOs 905, 915 in this implementation. The separate queues enable software level thread-ability of the processing. The queues are lock free to ensure that no blocking is introduced. The UDP test packets are transmitted and received using UDP user space software threads 975 and Kernel Ring Transmit Buffer 966 and Kernel Ring Buffer Receiver 986. This design also ensures that the processing of many dozens to thousands of test sessions can be distributed among multiple threads on a CPU. The statistics are calculated and reports generated using the statistics and reporting thread 942 that accesses the common statistics data store 922 which maintains statistics per stream and session. This strategy ensures high performance and enables introduction of processing for new streams and sessions to proceed in parallel with the existing streams and sessions, as described supra.

The stream parameters for each TWAMP test stream are listed next, with a session table for each session.

```
typedef struct_twamp_pm_stream_params
{
  twamp_pm_stream_cfg_t cfg;
  char interface[IFNAMSIZ];
  struct ether_addr dst_eth;
  int client_sock;
  twamp_pm_sess_params_t *sess; /* session table for each session */
```

The index into the server hash table is listed for each session in the example stream that follows. The accept index is the index into the accept port data store, which includes the UDP, for each test session.

```
      int16 accept_idx; /* Accept session index - tracks sessions */
      int8 error_flag; /* Error in control setup */
      int8 ctl_complete; /* Session control setup success */
      uint16 num_sessions;
      uint8 num_vlans;
      int8 route_added;
    } twamp_pm_stream_params_t;
```

TWAMP session parameters for each TWAMPPM test session follow.

```
          typedef struct _twamp_pm_sess_params
          {
            twamp_pm_sess_cfg_t cfg;
            uint64 next_pkt_tm;
            void *pCtx;
            void *pStrm;
            void *pStats;
          } twamp_pm_sess_params_t;
```

The TWAMP full-mesh measurement architecture is also designed to enable zero-touch network and service management. Control-clients and attendant session-senders and control-servers and attendant session-reflectors are distributed at different geographic locations of a TWAMP full-mesh measurement topology in the customer's network under test. If there is a power outage at a control-server location, the control-client will experience packet loss to this server. When the power is restored and the control-server is restarted by the test controller 176 after a phone home by the TWAMP server VTA. The session-reflectors are not started automatically as there is no state stored and restored across reboots by the server. Control-client 122 uses a fault management technique to automatically start testing to this rebooted server without operator intervention.

To support this feature, a fault management software thread runs on the VTA running the TWAMP client. The fault management algorithm proceeds as described next. The fault management thread analyzes the statistics stored in PM result data store 162 for every session. A per-session fault state variable is maintained. Also a per-server fault state variable is maintained. The states are 'initial', 'testing' and 'fault'. The state variables start in the 'initial' state. After the TWAMP control setup is complete and the TWAMP test starts, the state moves to 'testing' state. If there is packet loss on a session, the state is moved to 'fault' for that session. The server state remains in 'testing'. If the session stays in 'fault' state for a full reporting interval for all the sessions on that server, then the server state is moved to 'fault'. In one implementation, the control thread on the TWAMP client checks for the server fault state every 5 seconds. For every server in 'fault' state, the control thread stops the TWAMP test and TWAMP control to that server. The control thread then restarts the TWAMP control setup to that server. If setup is unsuccessful, an exponential back-off is used to decrease the rate of the process, to gradually find an acceptable rate, trying again after ten seconds, twenty seconds, forty seconds, eighty seconds and so on. Once the TWAMP control setup is successful the TWAMP test is started to the session-reflector on that server.

Key performance indicators (KPI) help the network operator track and correct problems in the network under test. In the existing TWAMP method the KPIs that are specified are latency, jitter, lost packets and out of sequence packets.

Figure 11:
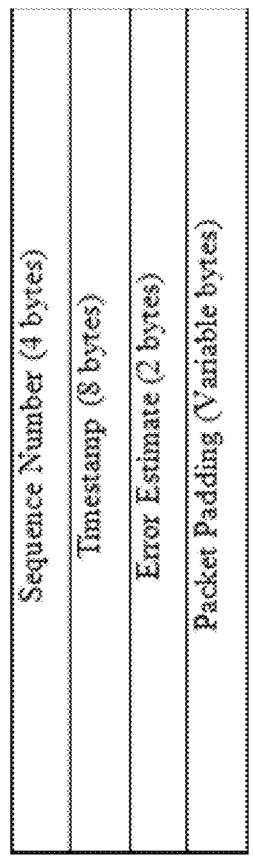
FIG. 11 shows message fields for TWAMP-Control Request TW-Session message, for reference.

FIG. 11 shows message fields for TWAMP-Control Request TW-Session message, for reference.

Figure 12:
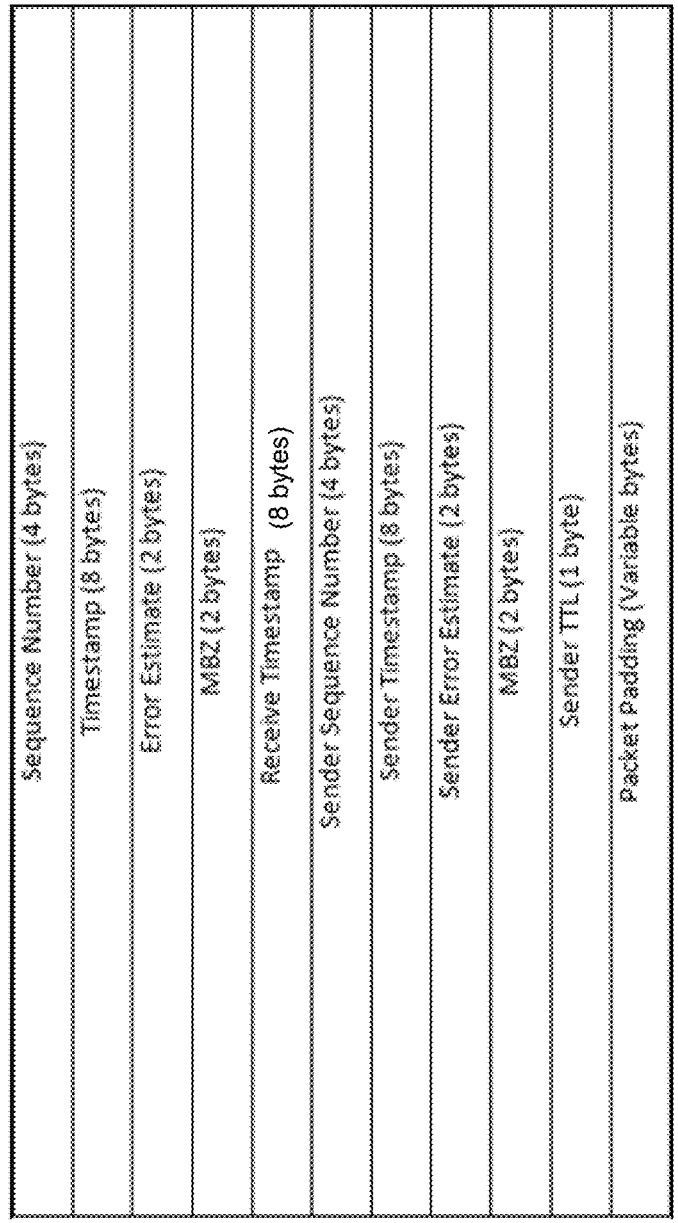
FIG. 12 shows TWAMP-Control Accept TW-Session Message fields, for reference.

FIG. 12 shows TWAMP-Control Accept TW-Session Message fields, for reference.

Computer System

Figure 10:
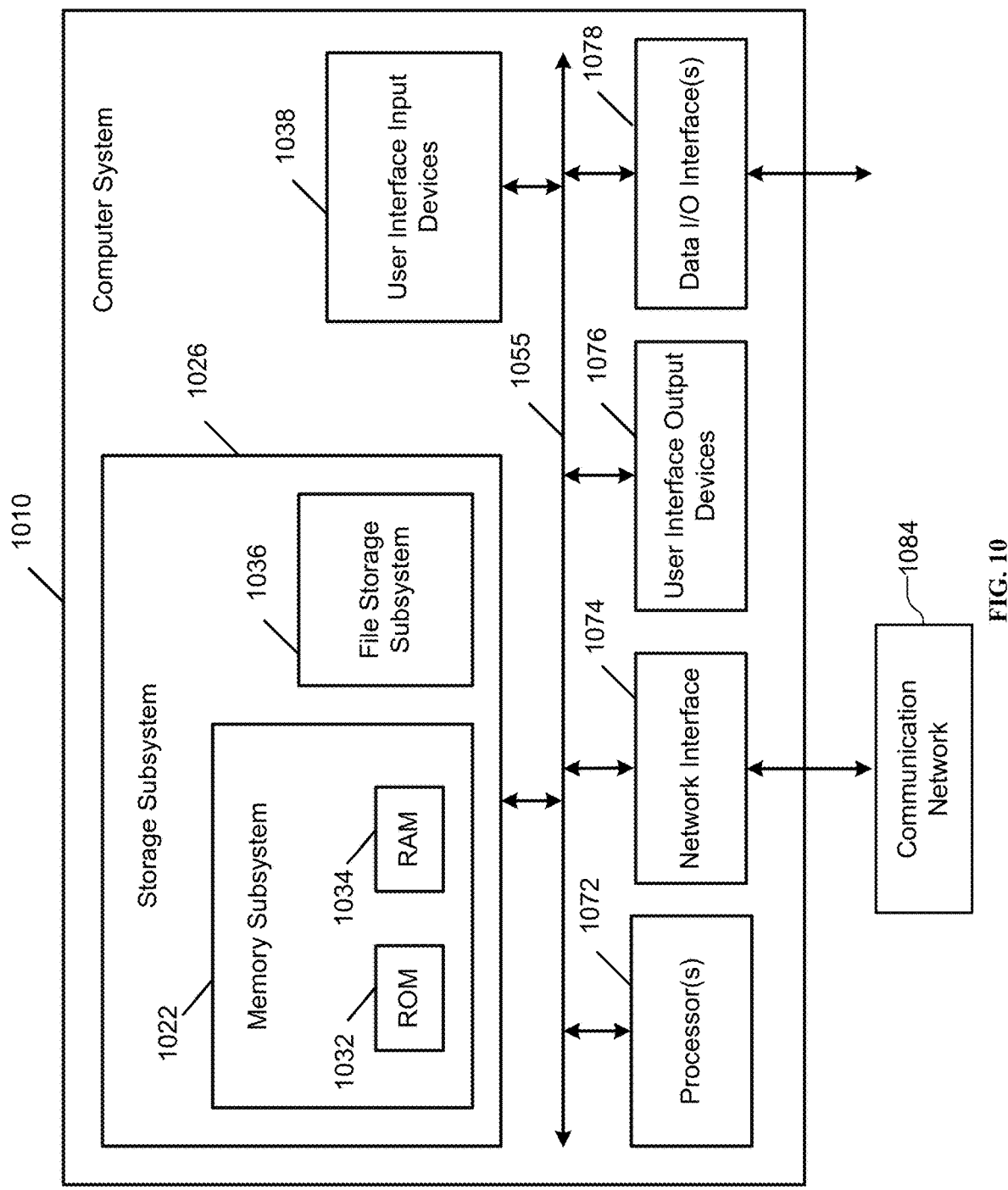
FIG. 10 is a block diagram of an exemplary system for improving scalability and fault tolerance for TWAMP with a large number of test sessions.

FIG. 10 is a simplified block diagram of a computer system 1010 that can be used for improving scalability and fault tolerance for TWAMP with a large number of test sessions. Computer system 1010 includes at least one central processing unit (CPU) 1072 that communicates with a number of peripheral devices via bus subsystem 1055. These peripheral devices can include a storage subsystem 1026 including, for example, memory devices and a file storage subsystem 1036, user interface input devices 1038, user interface output devices 1076, and a network interface subsystem 1074. The input and output devices allow user interaction with computer system 1010. Network interface subsystem 1074 provides an interface to outside networks, including an interface to corresponding interface devices in a communication network 1084 with other computer systems.

In one implementation, the network hosts of FIG. 1 can be communicably linked to the storage subsystem 1026 and the user interface input devices 1038. User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1026 stores programming and data constructs that provide the functionality of some or all of the modules and methods described herein. Memory subsystem 1022 used in the storage subsystem 1026 can include a number of memories including a main random access memory (RAM) 1034 for storage of instructions and data during program execution and a read only memory (ROM) 1032 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1026, or in other machines accessible by the processor.

Bus subsystem 1055 provides a mechanism for letting the various components and subsystems of computer system 1010 communicate with each other as intended. Although bus subsystem 1055 is shown schematically as a single bus, alternative implementations of the bus subsystem can use multiple busses.

Computer system 1010 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1010 depicted in FIG. 10 is intended only as a specific example for purposes of illustrating the preferred embodiments of the present invention. Many other configurations of computer system 1000 are possible having more or less components than the computer system depicted in FIG. 10.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of launching and updating a measurement architecture using Two-Way Active Measurement Protocol (abbreviated TWAMP) for testing a mesh network includes causing a control-client running on a first network host to receive and parse a configuration file to populate an in-memory data store with destination IP addresses, TCP and UDP transport ports, IP quality of service (abbreviated QoS) parameters, and test session parameters for key performance indicators (abbreviated KPI) used to originate a test including a set of two-way (abbreviated TW) test sessions originating from the first network host; and to originate test sessions with control-servers and session-reflectors using the test session parameters that specify the KPIs. The disclosed method also includes extending the causing to dozens to thousands of control-clients running on additional network hosts by sending to the control-clients, configuration files that cause the control-clients to originate respective test sessions with control-servers in a mesh network using respective test session parameters. The method also optionally includes, while the test is running, sending an updated configuration file to at least one control-client that introduces a new control-server or replaces a control-server; and causing the control-client to expand the test to include the new or replacement control-server without stopping or restarting TW test sessions with other control-servers; and monitoring the running test and receiving reports of results from the network hosts.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations of the disclosed method, the test session parameters include latency thresholds for counting packets that have measured travel time that exceeds the thresholds, including a round trip threshold, a session-sender to session-reflector threshold and a session-reflector to session-sender threshold; and further include receiving from the network hosts counts of the packets that have measured travel time that exceeds the thresholds.

For some implementation of the disclosed method, the test session parameters include jitter thresholds for measuring a number of test packets that have measured jitter that exceeds the thresholds, including a round trip threshold, a session-sender to session-reflector threshold and a session-reflector to session-sender threshold; and further include receiving from the network hosts counts of the packets that have measured jitter that exceeds the thresholds.

In some implementations, the test session parameters include latency thresholds for counting packets that have measured travel time that exceeds the thresholds, including a round trip threshold, a session-sender to session-reflector threshold and a session-reflector to session-sender threshold; and jitter thresholds for measuring a number of test packets that have measured jitter that exceeds the thresholds, including a round trip threshold, a session-sender to session-reflector threshold and a session-reflector to session-sender threshold; and further include receiving from the network hosts counts of the packets that have both measured travel time that exceeds one of the latency thresholds and measured jitter that exceeds one of the jitter thresholds.

In one implementation, the test session parameters include a session loss threshold for a percentage of TW test packets sent by a session-sender that are not reflected back by a session-reflector and received by the session-sender in a predetermined time interval; and further include receiving from the network hosts accumulated time for predetermined time intervals during which packet loss was below the session loss threshold or during which packet loss was above the session loss threshold or both. Another implementation of the disclosed method includes two session loss thresholds for loss and severe loss, wherein the severe loss threshold is greater than the loss threshold; and receiving from the network hosts accumulated time for both session loss thresholds.

In some implementations of the disclosed method, the configuration files sent to the dozens to thousands of control-clients go to subgroups of control-clients with differing respective test parameters for respective subgroups.

One implementation of the disclosed method further includes the network host relaying test session reports of the test sessions to a test results analysis module (abbreviated TRAM).

One implementation of the disclosed method further includes causing a particular control-client to evaluate results of the test sessions conducted by a particular session-sender co-located on a particular network host with the particular control-client; detect a continuing lack of response by a certain session-reflector in a particular test session, indicated by a lack of replies from the certain session-reflector; stop the particular test session between the particular session-sender and the certain session-reflector; responsive to the continuing lack of response; and originate replacement test sessions, with retries as necessary, between the particular session-sender and the certain session-reflector associated with a certain control-server. The disclosed method further includes causing the particular control-client to retry running a control setup to the certain control-server associated with the certain session-reflector until successful completion of the control setup with the certain control-server.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage medium loaded with computer program instructions that, when executed on a processor, implement the disclosed method described supra.

In one implementation, a disclosed method of enhancing scalability and fault tolerance by using a measurement architecture of Two-Way Active Measurement Protocol (abbreviated TWAMP) for testing a mesh network includes causing a control-client running on a first network host, to initialize an in-memory data store of test session parameters used to originate a test including a set of two-way (abbreviated TW) test sessions originating from the first network host; to parse a configuration file to populate the in-memory data store with destination IP addresses, TCP and UDP transport ports and IP quality of service (abbreviated QoS) parameters for control-servers and session-reflectors; and to originate test sessions with the control-servers and session-reflectors using the test session parameters. The disclosed method also includes extending the causing to initializing the in-memory data store, parsing the configuration file, and originating test sessions to dozens to thousands of control-clients, each originating respective test sessions with control-servers in a mesh network using respective test session parameters. Optionally, while the test is running, the disclosed method includes sending an updated configuration file to at least one control-client that introduces a new control-server or replaces a control-server; causing the control-client to parse the updated configuration file and update the in-memory data structure to include the new control-server destination IP address, TCP and UDP transport port numbers and IP QoS parameters; and causing the control-client to expand the test to include the new control-server. The disclosed method also includes monitoring the running test sessions with the control-servers for reports of results.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations of the disclosed method further include causing the control-client to initialize a server hash table data store and populate the server hash table data store with an index entry to test session parameters stored in memory for each of the control-servers and session-reflectors; extending the causing, to initialize and populate the server hash table data store, to dozens to thousands of control-clients, each originating respective test sessions with control-servers running on additional network hosts in a mesh network using respective test session parameters; and while the test is running, causing the control-client to generate an index entry into the server hash table data store for the new control-server; and causing the control-client to determine, using the generated index entry, whether the new or replaced control-server is represented in the server hash table data store, and if not represented, updating the server hash table data store by adding an index entry representing the new or replaced control-server. The ability to add control-servers without needing to stop and restart ongoing tests contributes to scalability for performance measurement of telecommunication transport networks with a large number of test sessions. The ability to replace control-servers that have failed or that need maintenance, without needing to stop and restart ongoing tests, contributes to fault tolerance for performance measurement of telecommunication transport networks with a large number of test sessions. In one implementation of the disclosed method, the index entry for the server hash table data store includes a 4-byte IPv4 address and a 2-byte UDP port for the control-server. In another implementation, the index entry for the server hash table data store includes a 16-byte IPv6 address and a 2-byte UDP port number for the control-server.

Some implementations of the disclosed method include populating the in-memory data store with test parameters from the parsed configuration file, including one or more of test frame length, jitter threshold round trip, jitter threshold near, jitter threshold far, latency threshold round trip, latency threshold far, latency threshold near, and session loss threshold round trip. Some implementations include the control-client originating hundreds to thousands of test sessions with control-servers on additional network hosts using the test session parameters.

One implementation of the disclosed method further includes the network host relaying test session reports of the test sessions to a test results analysis module (abbreviated TRAM).

In another implementation, a disclosed system includes one or more processors coupled to memory, the memory impressed with computer instructions, the instructions, when executed on the processors, implement actions of the disclosed method described supra.

In yet another implementation a disclosed tangible non-transitory computer readable storage medium impressed with computer program instructions that, when executed on a processor, implement the disclosed method described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim:

1. A method of extending a Two-Way Active Measurement Protocol (abbreviated TWAMP) measurement architecture to monitoring a large network, the method including:
   providing one or more configuration files of test session parameters used by dozens to thousands of control-clients to originate concurrently running test sessions with control-servers, wherein the configuration files specify that network hosts running at least one control-client engage in test sessions with multiple network hosts running the control-servers, and wherein the test sessions running concurrently on the network hosts collectively form a mesh;
   distributing the configuration files to the dozens to thousands of control-clients;
   repeatedly causing first control-clients running on first network hosts:
      to parse a configuration file to populate an in-memory data store with destination IP addresses, TCP and UDP transport ports and IP quality of service (abbreviated QoS) parameters for control-servers and session-reflectors; and
      to originate test sessions with the control-servers and session-reflectors on at least second and third network hosts using the test session parameters, thereby forming the mesh;
   monitoring the dozens to thousands of concurrently running test sessions for reports of test results.

2. The method of claim 1,
   wherein the in-memory data stores of the first control-clients include server hash tables;
   further including populating the server hash tables with index entries based on the test session parameters for the control-servers and session-reflectors.

3. The method of claim 2, further including, while the test sessions are running, causing a fourth control-client, among the first control clients,
   to determine that a fourth control-server in an updated configuration file is not represented in the server hash table, and
   to update the server hash table by adding an index entry representing the added control-server.

4. The method of claim 2, wherein the index entry for the server hash table data store includes a 16-byte IPv6 address and a 2-byte UDP port number for the control-server.

5. The method of claim 1, further including populating the in-memory data store with test parameters from the parsed configuration file, including one or more of test frame length, jitter threshold round trip, jitter threshold near, jitter threshold far, latency threshold round trip, latency threshold far, latency threshold near, and session loss threshold round trip.

6. The method of claim 1, further including, while the test sessions are running:
   sending an updated configuration file to at least a fifth control-client, among the first control-clients, that introduces a new control-server to expand testing sessions;
   causing the fifth control-client to parse the updated configuration file and update the in-memory data store to include the new control-server's destination IP address, TCP and UDP transport port numbers and IP QoS parameters; and
   causing the fifth control-client to update one or more test sessions to use the new control-server.

7. The method of claim 1, further including, while the test sessions are running:
   sending an updated configuration file to at least a sixth control-client, among the first control-clients, that introduces a replacement control-server to replace a previously designated control-server;
   causing the sixth control-client to parse the updated configuration file and update the in-memory data store to include the replacement control-server's destination IP address, TCP and UDP transport port numbers and IP QoS parameters; and
   causing the sixth control-client to update one or more test sessions to use the replacement control-server.

8. The method of claim 1, further including at least a subset of the first network hosts to further host control-servers and session-reflectors, in addition to control-clients and session-hosts.

9. A system including one or more processors coupled to memory, the memory loaded with computer instructions that, when executed on the processors, extend a Two-Way Active Measurement Protocol (abbreviated TWAMP) measurement architecture to monitoring a large network launch, with actions comprising:
   providing one or more configuration files of test session parameters used by dozens to thousands of control-clients to originate concurrently running test sessions with control-servers, wherein the configuration files specify that network hosts running at least one control-client engage in test sessions with multiple network hosts running the control-servers, and wherein the test sessions running concurrently on the network hosts collectively form a mesh;
   distributing the configuration files to the dozens to thousands of control-clients;
   repeatedly causing first control-clients running on first network hosts:
      to parse a configuration file to populate an in-memory data store with destination IP addresses, TCP and UDP transport ports and IP quality of service (abbreviated QoS) parameters for control-servers and session-reflectors; and
      to originate test sessions with the control-servers and session-reflectors on at least second and third network hosts using the test session parameters, thereby forming the mesh;
   monitoring the dozens to thousands of concurrently running test sessions for reports of test results.

10. The system of claim 9,
    wherein the in-memory data stores of the first control-clients include server hash tables;
    further including populating the server hash tables with index entries based on the test session parameters for the control-servers and session-reflectors.

11. The system of claim 10, further including, while the test sessions are running, the actions of causing a fourth control-client, among the first control clients, to determine that a fourth control-server in an updated configuration file is not represented in the server hash table, and to update the server hash table by adding an index entry representing the added control-server.

12. The system of claim 9, further including, while the test sessions are running, the actions of:

sending an updated configuration file to at least a fifth control-client, among the first control-clients, that introduces a new control-server to expand testing sessions;

causing the fifth control-client to parse the updated configuration file and update the in-memory data store to include the new control-server's destination IP address, TCP and UDP transport port numbers and IP QoS parameters; and causing the fifth control-client to update one or more test sessions to use the new control-server.

13. The system of claim 10, with actions further including populating the in-memory data store with test parameters from the parsed configuration file, including one or more of test frame length, jitter threshold round trip, jitter threshold near, jitter threshold far, latency threshold round trip, latency threshold far, latency threshold near, and session loss threshold round trip.

14. The system of claim 9, further including, while the test sessions are running, the actions of:

sending an updated configuration file to at least a sixth control-client, among the first control-clients, that introduces a replacement control-server to replace a previously designated control-server;

causing the sixth control-client to parse the updated configuration file and update the in-memory data store to include the replacement control-server's destination IP address, TCP and UDP transport port numbers and IP QoS parameters; and causing the sixth control-client to update one or more test sessions to use the replacement control-server.

15. A tangible non-transitory computer readable storage medium impressed with computer program instructions that, when executed on a processor, cause the processor to implement actions comprising:

providing one or more configuration files of test session parameters used by dozens to thousands of control-clients to originate concurrently running test sessions with control-servers, wherein the configuration files specify that network hosts running at least one control-client engage in test sessions with multiple network hosts running the control-servers, and wherein the test sessions running concurrently on the network hosts collectively form a mesh;

distributing the configuration files to the dozens to thousands of control-clients repeatedly causing first control-clients running on first network hosts:

to parse a configuration file to populate an in-memory data store with destination IP addresses, TCP and UDP transport ports and IP quality of service (abbreviated QoS) parameters for control-servers and session-reflectors; and to originate test sessions with the control-servers and session-reflectors on at least second and third network hosts using the test session parameters, thereby forming the mesh;

monitoring the dozens to thousands of concurrently running test sessions for reports of test results.

16. The tangible non-transitory computer readable storage medium of claim 15, wherein the in-memory data stores of the first control-clients include server hash tables;

further including populating the server hash tables with index entries based on the test session parameters for the control-servers and session-reflectors.

17. The tangible non-transitory computer readable storage medium of claim 16, further including, while the test sessions are running, the actions of causing a fourth control-client, among the first control clients, to determine that a fourth control-server in an updated configuration file is not represented in the server hash table, and to update the server hash table by adding an index entry representing the added control-server.

18. The tangible non-transitory computer readable storage medium of claim 15, further including the action of populating the in-memory data store with test parameters from the parsed configuration file, including one or more of test frame length, jitter threshold round trip, jitter threshold near, jitter threshold far, latency threshold round trip, latency threshold far, latency threshold near, and session loss threshold round trip.

19. The tangible non-transitory computer readable storage medium of claim 15, further including, while the test sessions are running, the actions of:

sending an updated configuration file to at least a fifth control-client, among the first control-clients, that introduces a new control-server to expand testing sessions;

causing the fifth control-client to parse the updated configuration file and update the in-memory data store to include the new control-server's destination IP address, TCP and UDP transport port numbers and IP QoS parameters; and causing the fifth control-client to update one or more test sessions to use the new control-server.

20. The tangible non-transitory computer readable storage medium of claim 15, further including, while the test sessions are running, the actions of:

sending an updated configuration file to at least a sixth control-client, among the first control-clients, that introduces a replacement control-server to replace a previously designated control-server;

causing the sixth control-client to parse the updated configuration file and update the in-memory data store to include the replacement control-server's destination IP address, TCP and UDP transport port numbers and IP QoS parameters; and causing the sixth control-client to update one or more test sessions to use the replacement control-server.

* * * * *